(12) United States Patent
Prager et al.

(10) Patent No.: US 11,410,114 B2
(45) Date of Patent: Aug. 9, 2022

(54) DELIVERY OF TEMPERATURE-SENSITIVE ITEMS

(71) Applicant: Wing Aviation LLC, Mountain View, CA (US)

(72) Inventors: Andre Prager, Sunnyvale, CA (US); Kaiwen Gu, Sunnyvale, CA (US)

(73) Assignee: Wing Aviation LLC, Mountain View, CA (US)

( * ) Notice: Subject to any disclaimer, the term of this patent is extended or adjusted under 35 U.S.C. 154(b) by 632 days.

(21) Appl. No.: 15/968,507

(22) Filed: May 1, 2018

(65) Prior Publication Data

US 2019/0340569 A1    Nov. 7, 2019

(51) Int. Cl.
*G06Q 10/08* (2012.01)
*B64C 39/02* (2006.01)

(52) U.S. Cl.
CPC ....... *G06Q 10/0832* (2013.01); *B64C 39/024* (2013.01); *B64C 2201/042* (2013.01); *B64C 2201/128* (2013.01)

(58) Field of Classification Search
CPC .............. G06Q 10/0832; B64C 39/024; B64C 2201/042; B64C 2201/128
See application file for complete search history.

(56) References Cited

U.S. PATENT DOCUMENTS

| | | | |
|---|---|---|---|
| 10,207,804 B1* | 2/2019 | Gentry | B64D 9/00 |
| 2009/0058239 A1 | 3/2009 | Kuo et al. | |
| 2016/0111006 A1* | 4/2016 | Srivastava | G08G 5/0043 701/3 |
| 2016/0257401 A1 | 9/2016 | Buchmueller et al. | |
| 2017/0001724 A1 | 1/2017 | Yates | |
| 2017/0075360 A1* | 3/2017 | Von Novak | B64C 27/08 |
| 2017/0220977 A1 | 8/2017 | Vaananen | |
| 2017/0286905 A1 | 10/2017 | Richardson et al. | |
| 2017/0300855 A1 | 10/2017 | Lund et al. | |

(Continued)

OTHER PUBLICATIONS

Robert Lee Hotz, In Rwanda, Drones Deliver Medical Supplies to Remote Areas, Dec. 1, 2017, The Wall Street Journal, (Year: 2017).*

(Continued)

*Primary Examiner* — Resha Desai
*Assistant Examiner* — Ismail A Manejwala
(74) *Attorney, Agent, or Firm* — McDonnell Boehnen Hulbert & Berghoff LLP

(57) ABSTRACT

Disclosed herein are methods and systems that can help an aerial transport service provider (ATSP) select an unmanned vehicle (UV) to deliver a temperature-sensitive item. In accordance with example embodiments, the ATSP system can generate a transport task to fulfill a request for delivery of the temperature-sensitive item, where the transport task involves delivering the item while maintaining a temperature of the item within a preferred temperature range. The system can calculate an amount of required energy to perform the transport task for each available UV of the fleet of UVs. Further, based on (i) the amount of required energy for each available UV, and (ii) a respective remaining battery energy level for each available UV, the ATSP system can select a first UV to perform the task. Yet further, the ATSP system can assign the transport task to the first UV.

17 Claims, 11 Drawing Sheets

(56) References Cited

U.S. PATENT DOCUMENTS

| | | |
|---|---|---|
| 2018/0105289 A1 | 4/2018 | Walsh et al. |
| 2018/0118374 A1* | 5/2018 | Lombardini .......... B64C 39/024 |
| 2018/0236840 A1* | 8/2018 | Cantrell ............. B60H 1/00014 |
| 2018/0362156 A1* | 12/2018 | Hall ...................... B64C 39/024 |
| 2019/0277647 A1* | 9/2019 | Adetola ................. B60K 35/00 |
| 2020/0050200 A1* | 2/2020 | Torii ........................ B64F 1/22 |

OTHER PUBLICATIONS

International Searching Authority, International Search Report and Written Opinion dated Aug. 9, 2019, issued in connection with International Patent Application No. PCT/US2019/027566, filed on Aug. 9, 2019, 12 pages.

* cited by examiner

DELIVERY OF TEMPERATURE-SENSITIVE ITEMS

BACKGROUND

An unmanned system, which may also be referred to as an autonomous vehicle, is a vehicle capable of travel without a physically-present human operator. An unmanned system may operate in a remote-control mode, in an autonomous mode, or in a partially autonomous mode.

When an unmanned system operates in a remote-control mode, a pilot or driver that is at a remote location can control the unmanned vehicle via commands that are sent to the unmanned vehicle via a wireless link. When the unmanned system operates in autonomous mode, the unmanned system typically moves based on pre-programmed navigation waypoints, dynamic automation systems, or a combination of these. Further, some unmanned systems can operate in both a remote-control mode and an autonomous mode, and in some instances may do so simultaneously. For instance, a remote pilot or driver may wish to leave navigation to an autonomous system while manually performing another task, such as operating a mechanical system for picking up objects, as an example.

Various types of unmanned systems exist for various different environments. For instance, unmanned aerial vehicles (UAVs) are configured for operation in the air (e.g., flight). Examples include quad-copters and tail-sitter UAVs, among others. Unmanned systems also exist for hybrid operations in which multi-environment operation is possible. Examples of hybrid unmanned vehicles include an amphibious craft that is capable of operation on land as well as on water or a floatplane that is capable of landing on water as well as on land. Other examples are also possible.

SUMMARY

An aerial transport service provider (ATSP) can provide an aerial delivery service to third-party item providers, perhaps using a fleet of unmanned aerial vehicles (UAVs). In some instances, the third-party item providers can request the ATSP to deliver temperature-sensitive items. In order to avoid ruining or spoiling the items, the temperature-sensitive items must be maintained at a particular temperature during the delivery. Accordingly, to deliver such temperature-sensitive items without spoiling the items, at least some of the UAVs of the fleet can include or be configured to receive a temperature control unit. The temperature control unit can include a temperature controlled compartment in which temperature-sensitive items could be transported. For example, the temperature control unit can take the form of a temperature-controlled packaging that can be coupled to the UAV and in which items could be transported.

However, operation of a temperature control unit can consume significant UAV battery resources. In order to avoid any mishaps (e.g., the UAV battery depleting before the item is delivered), it is desirable for the ATSP to assign the task of delivering a temperature-sensitive item to a UAV that is capable of delivering the item without encountering mishaps. Accordingly, disclosed herein is a method of selecting, from a fleet of UAVs, a UAV that can successfully deliver a specific temperature-sensitive item to a specified delivery location. Within examples, selecting the UAV can be based on a preferred temperature range at which the item can be maintained, an estimated travel distance that available UAVs would travel to perform the task, a total weight of the available UAVs, among other factors.

In one aspect a method is disclosed. The method includes generating a transport task to fulfill a request for delivery of a temperature-sensitive item, where the transport task involves delivering the temperature-sensitive item while maintaining a temperature of the temperature-sensitive item within a preferred temperature range. The method also includes calculating an amount of required energy to perform the transport task for each available unmanned vehicle (UV) of a fleet of UVs. Further, the method includes, based on (i) the amount of required electrical energy for each available UV, and (ii) a respective remaining battery energy level for each available UV, selecting a first UV to perform the transport task. Yet further, the method includes assigning the transport task to the first UV.

In another aspect, a system is disclosed. The system includes a fleet of unmanned vehicles (UVs) that are configured to transport temperature-sensitive items. The system also includes at least one communication interface operable to communicate with item-provider computing devices, and at least one processor. Further, the system includes program instructions stored on a non-transitory computer readable medium and executable by the at least one processor to perform functions including: generating a transport task in response to receiving from an item-provider computing device a request for delivery of a temperature-sensitive item, where the transport task involves delivering the temperature-sensitive item while maintaining a temperature of the temperature-sensitive item within a preferred temperature range. The functions also include calculating an amount of required energy to perform the transport task for each available unmanned vehicle (UV) of a fleet of UVs. Further, the functions include based on (i) the amount of required electrical energy for each available UV, and (ii) a respective remaining battery energy level for each available UV, selecting a first UV to perform the task. Yet further, the functions include assigning the transport task to the first UV.

In another aspect, a method is disclosed. The method includes generating a transport task to fulfill a request for delivery of a temperature-sensitive item, where the transport task involves delivering the temperature-sensitive item while maintaining a temperature of the temperature-sensitive item within a preferred temperature range. The method also includes based on the transport task, selecting an unmanned vehicle (UV) tier from which to select a UV to perform the transport task. Furthermore, the method includes calculating an amount of required energy to perform the transport task for each available UV of the selected UV tier. Further, the method includes based on (i) the amount of required electrical energy for each available UV, and (ii) a respective remaining battery energy level for each available UV, selecting a first UV to perform the task. Yet further, the method includes assigning the transport task to the first UV.

These as well as other aspects, advantages, and alternatives, will become apparent to those of ordinary skill in the art by reading the following detailed description, with reference where appropriate to the accompanying drawings.

DETAILED DESCRIPTION

Figure 1A:
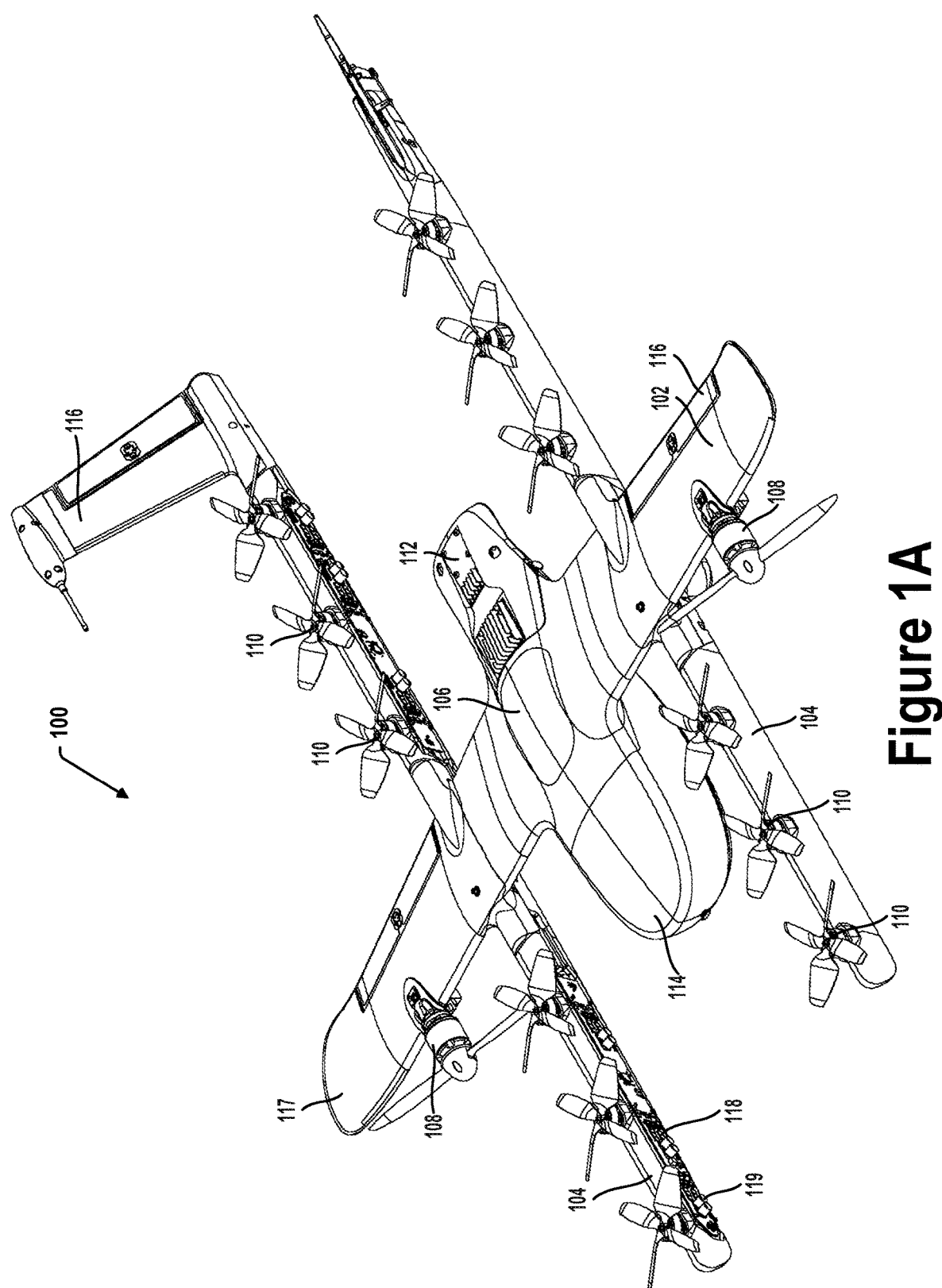
FIG. 1A is a simplified illustration of an unmanned aerial vehicle, according to example embodiments.

Example methods and systems are described herein. It should be understood that the words "example" and "example" are used herein to mean "serving as an example, instance, or illustration." Any embodiment or feature described herein as being an "example" or "example" is not necessarily to be construed as preferred or advantageous over other embodiments or features. The example embodiments described herein are not meant to be limiting. It will be readily understood that certain aspects of the disclosed systems and methods can be arranged and combined in a wide variety of different configurations, all of which are contemplated herein.

Furthermore, the particular arrangements shown in the Figures should not be viewed as limiting. It should be understood that other embodiments might include more or less of each element shown in a given Figure. Further, some of the illustrated elements may be combined or omitted. Yet further, an example embodiment may include elements that are not illustrated in the Figures.

I. OVERVIEW

An aerial transport service provider (ATSP) can be a separate entity from the entity or entities that provide items being transported and/or interface with the recipients who request delivery of these items. For example, a company or entity that operates a fleet of UAVs configured for item delivery can provide delivery services to third-party entities, such as restaurants, clothing stores, grocery stores, and other "brick and mortar" and/or online retailers, among other possibilities. These third-party entities can have accounts with the UAV transport service provider, via which the third-parties can request and/or purchase UAV transport services from the transport service provider. Further, the third-party entities could interface with recipients (e.g., customers) directly, or through computing systems (e.g., applications and/or server systems) provided by the UAV transport service provider.

Furthermore, the ATSP can be contracted by various third-party entities to deliver different types of items. In some instances, a third party could request delivery of items that have certain characteristics that must be accounted for when delivering the items. In order to deliver such items, the ATSP can include, within its fleet of UAVs, UAVs that are configured to deliver items that have the certain characteristics.

A common example of an item characteristic that must be accounted for during delivery is a temperature of the item. Many types of items, e.g., pharmaceuticals, perishable foods, hot foods, etc., must be maintained within a particular temperature range during delivery (i.e., while a temperature-controlled payload is in transit from a pick-up time and/or location to drop-off time and/or location by a UAV). Otherwise, the items could spoil or the recipient could be dissatisfied with the delivery (e.g., when prepared food is delivered cold). Thus, in order to deliver temperature-sensitive items, the ATSP can include UAVs that are equipped with features that allow the UAVs to deliver temperature-sensitive items. For example, the UAVs can include a temperature control unit that could be used to actively control a temperature of a compartment to be within a specific temperature range during delivery.

However, a temperature control unit can consume significant battery resources from the UAV. In particular, the amount of battery resources that the unit can consume can depend on various factors, such as the temperature(s) at which the compartment operates, the distance that the UAV will travel, among other factors. Due to the various factors, a UAV can encounter obstacles during delivery that can prevent the UAV from delivering a temperature-sensitive item. For instance, due to the high consumption of UAV battery energy, the temperature control unit can deplete the UAV battery before the UAV delivers the item, which can result in a failed delivery. Therefore, merely assigning a transport task to a UAV that includes a temperature control unit does not ensure successful delivery of a temperature-sensitive payload.

Disclosed herein is a method that allows the ATSP to assign a temperature-sensitive transport task to a UAV that is capable of successfully delivering the temperature-sensitive item. In an embodiment, the method can involve receiving a request for delivery of a temperature-sensitive item. In addition to indicating the delivery location for the item, the request can indicate a preferred temperature range at which to maintain the item during delivery (i.e., from pick-up to drop-off). If the request does not include a preferred temperature range, the ATSP can determine a preferred temperature range for the item.

Then, based on the request, the ATSP can generate a transport task that includes instructions to deliver the temperature-sensitive item to the delivery location while maintaining a temperature of the item at a temperature within the preferred temperature range.

Once the transport task is generated, the ATSP can calculate an amount of required energy to perform the transport task for each available unmanned vehicle (UV) of a fleet of UVs. Additionally, the ATSP can determine the respective remaining battery energy level for each available UAV. Then, the ATSP can use the determined information to select a UAV to perform the transport task.

Note that herein, a "transport task" can generally involve a UAV picking up an item or items from one location (e.g., a source location specified by the item provider), delivering the item or items to another location, and returning to a base location (e.g., a UAV nest or charging station), where the UAV can recharge and/or be readied for its next assigned transport task. Further, multi-delivery transport tasks are possible, which can include additional flight legs in order to deliver item(s) at multiple delivery locations, before returning to the base location. More generally, a transport task may be any sequence of flights implemented by a given UAV to complete a particular task, such as picking up and delivering an item or items.

Further, it should be understood that an "item provider(s)" may include any entity that has items to be delivered to any type of "recipient." Item recipients may be any entities or locations capable of receiving delivery of an item, such as merchants, vendors, dealers, retailers, seller, shippers, customers and other laypersons, among other possibilities.

Furthermore, it should be understood that although the Figures describe an unmanned aerial vehicle, the methods and systems disclosed herein can also be applicable to other types of unmanned vehicles such as unmanned ground vehicles and unmanned underwater vehicles. Other example vehicles include hybrid unmanned vehicles that can operate in multiple environments. Examples of hybrid unmanned vehicles include an amphibious craft that is capable of operation on land as well as on water or a floatplane that is capable of landing on water as well as on land. Other examples are also possible.

II. ILLUSTRATIVE UNMANNED VEHICLES

Herein, the terms "unmanned aerial system" and "UAV" refer to any autonomous or semi-autonomous vehicle that is capable of performing some functions without a physically present human pilot.

A UAV can take various forms. For example, a UAV may take the form of a fixed-wing aircraft, a glider aircraft, a tail-sitter aircraft, a jet aircraft, a ducted fan aircraft, a lighter-than-air dirigible such as a blimp or steerable balloon, a rotorcraft such as a helicopter or multicopter, and/or an ornithopter, among other possibilities. Further, the terms "drone," "unmanned aerial vehicle system" (UAVS), or "unmanned aerial vehicle" (UAV) may also be used to refer to a UAV.

FIG. 1A is an isometric view of an example UAV 100. UAV 100 includes wing 102, booms 104, and a fuselage 106. Wings 102 may be stationary and may generate lift based on the wing shape and the UAV's forward airspeed. For instance, the two wings 102 may have an airfoil-shaped cross section to produce an aerodynamic force on UAV 100. In some embodiments, wing 102 may carry horizontal propulsion units 108, and booms 104 may carry vertical propulsion units 110. In operation, power for the propulsion units may be provided from a battery compartment 112 of fuselage 106. In some embodiments, fuselage 106 also includes an avionics compartment 114, an additional battery compartment (not shown) and/or a delivery unit (not shown, e.g., a winch system) for handling the payload. In some embodiments, fuselage 106 is modular, and two or more compartments (e.g., battery compartment 112, avionics compartment 114, other payload and delivery compartments) are detachable from each other and securable to each other (e.g., mechanically, magnetically, or otherwise) to contiguously form at least a portion of fuselage 106.

In some embodiments, booms 104 terminate in rudders 116 for improved yaw control of UAV 100. Further, wings 102 may terminate in wing tips 117 for improved control of lift of the UAV In the illustrated configuration, UAV 100 includes a structural frame. The structural frame may be referred to as a "structural H-frame" or an "H-frame" (not shown) of the UAV. The H-frame may include, within wings 102, a wing spar (not shown) and, within booms 104, boom carriers (not shown). In some embodiments the wing spar and the boom carriers may be made of carbon fiber, hard plastic, aluminum, light metal alloys, or other materials. The wing spar and the boom carriers may be connected with clamps. The wing spar may include pre-drilled holes for horizontal propulsion units 108, and the boom carriers may include pre-drilled holes for vertical propulsion units 110.

In some embodiments, fuselage 106 may be removably attached to the H-frame (e.g., attached to the wing spar by clamps, configured with grooves, protrusions or other features to mate with corresponding H-frame features, etc.). In other embodiments, fuselage 106 similarly may be removably attached to wings 102. The removable attachment of fuselage 106 may improve quality and or modularity of UAV 100. For example, electrical/mechanical components and/or subsystems of fuselage 106 may be tested separately from, and before being attached to, the H-frame. Similarly, printed circuit boards (PCBs) 118 may be tested separately from, and before being attached to, the boom carriers, therefore eliminating defective parts/subassemblies prior to completing the UAV. For example, components of fuselage 106 (e.g., avionics, battery unit, delivery units, an additional battery compartment, etc.) may be electrically tested before fuselage 106 is mounted to the H-frame. Furthermore, the motors and the electronics of PCBs 118 may also be electrically tested before the final assembly. Generally, the identification of the defective parts and subassemblies early in the assembly process lowers the overall cost and lead time of the UAV. Furthermore, different types/models of fuselage 106 may be attached to the H-frame, therefore improving the modularity of the design. Such modularity allows these various parts of UAV 100 to be upgraded without a substantial overhaul to the manufacturing process.

In some embodiments, a wing shell and boom shells may be attached to the H-frame by adhesive elements (e.g., adhesive tape, double-sided adhesive tape, glue, etc.). Therefore, multiple shells may be attached to the H-frame instead of having a monolithic body sprayed onto the H-frame. In some embodiments, the presence of the multiple shells reduces the stresses induced by the coefficient of thermal expansion of the structural frame of the UAV. As a result, the UAV may have better dimensional accuracy and/or improved reliability.

Moreover, in at least some embodiments, the same H-frame may be used with the wing shell and/or boom shells having different size and/or design, therefore improving the modularity and versatility of the UAV designs. The wing shell and/or the boom shells may be made of relatively light polymers (e.g., closed cell foam) covered by the harder, but relatively thin, plastic skins.

The power and/or control signals from fuselage 106 may be routed to PCBs 118 through cables running through fuselage 106, wings 102, and booms 104. In the illustrated embodiment, UAV 100 has four PCBs, but other numbers of PCBs are also possible. For example, UAV 100 may include two PCBs, one per the boom. The PCBs carry electronic components 119 including, for example, power converters, controllers, memory, passive components, etc. In operation, propulsion units 108 and 110 of UAV 100 are electrically connected to the PCBs.

Many variations on the illustrated UAV are possible. For instance, fixed-wing UAVs may include more or fewer rotor units (vertical or horizontal), and/or may utilize a ducted fan or multiple ducted fans for propulsion. Further, UAVs with more wings (e.g., an "x-wing" configuration with four wings), are also possible. Although FIG. 1A illustrates two wings 102, two booms 104, two horizontal propulsion units 108, and six vertical propulsion units 110 per boom 104, it should be appreciated that other variants of UAV 100 may be implemented with more or less of these components. For example, UAV 100 may include four wings 102, four booms 104, and more or less propulsion units (horizontal or vertical).

Figure 1B:
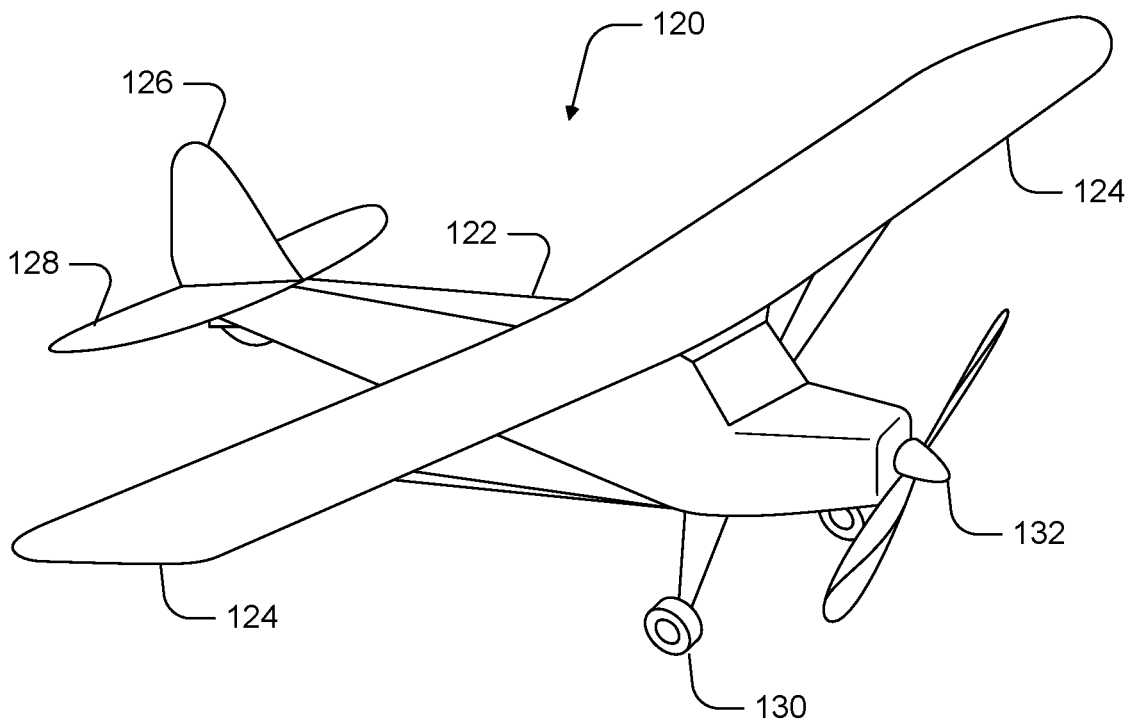
FIG. 1B is a simplified illustration of an unmanned aerial vehicle, according to example embodiments.

Similarly, FIG. 1B shows another example of a UAV 120. The UAV 120 includes a fuselage 122, two wings 124 with an airfoil-shaped cross section to provide lift for the UAV 120, a vertical stabilizer 126 (or fin) to stabilize the plane's yaw (turn left or right), a horizontal stabilizer 128 (also referred to as an elevator or tailplane) to stabilize pitch (tilt up or down), landing gear 130, and a propulsion unit 132, which can include a motor, shaft, and propeller.

Figure 1C:
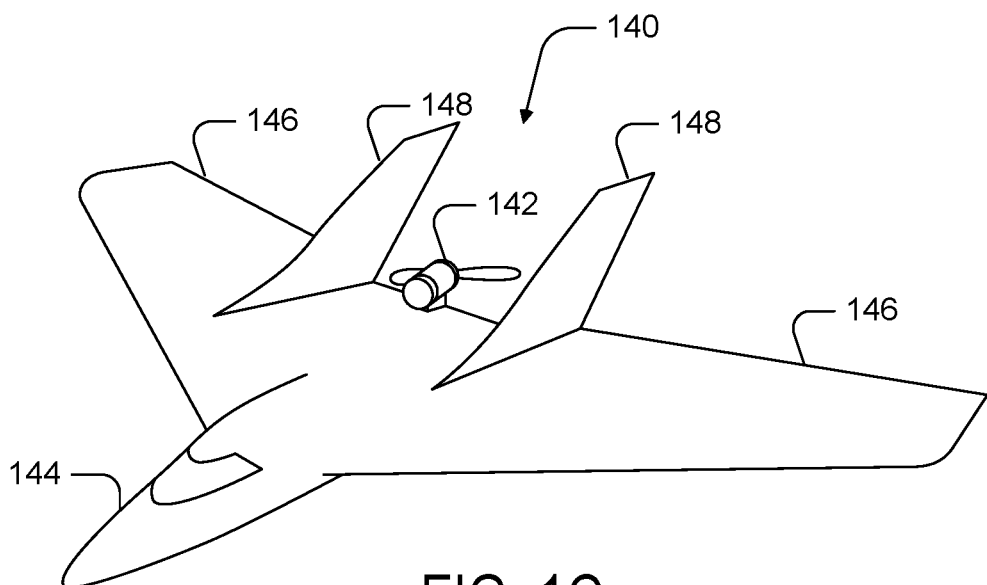
FIG. 1C is a simplified illustration of an unmanned aerial vehicle, according to example embodiments.

FIG. 1C shows an example of a UAV 140 with a propeller in a pusher configuration. The term "pusher" refers to the fact that a propulsion unit 142 is mounted at the back of the UAV and "pushes" the vehicle forward, in contrast to the propulsion unit being mounted at the front of the UAV. Similar to the description provided for FIGS. 1A and 1B, FIG. 1C depicts common structures used in a pusher plane, including a fuselage 144, two wings 146, vertical stabilizers 148, and the propulsion unit 142, which can include a motor, shaft, and propeller.

Figure 1D:
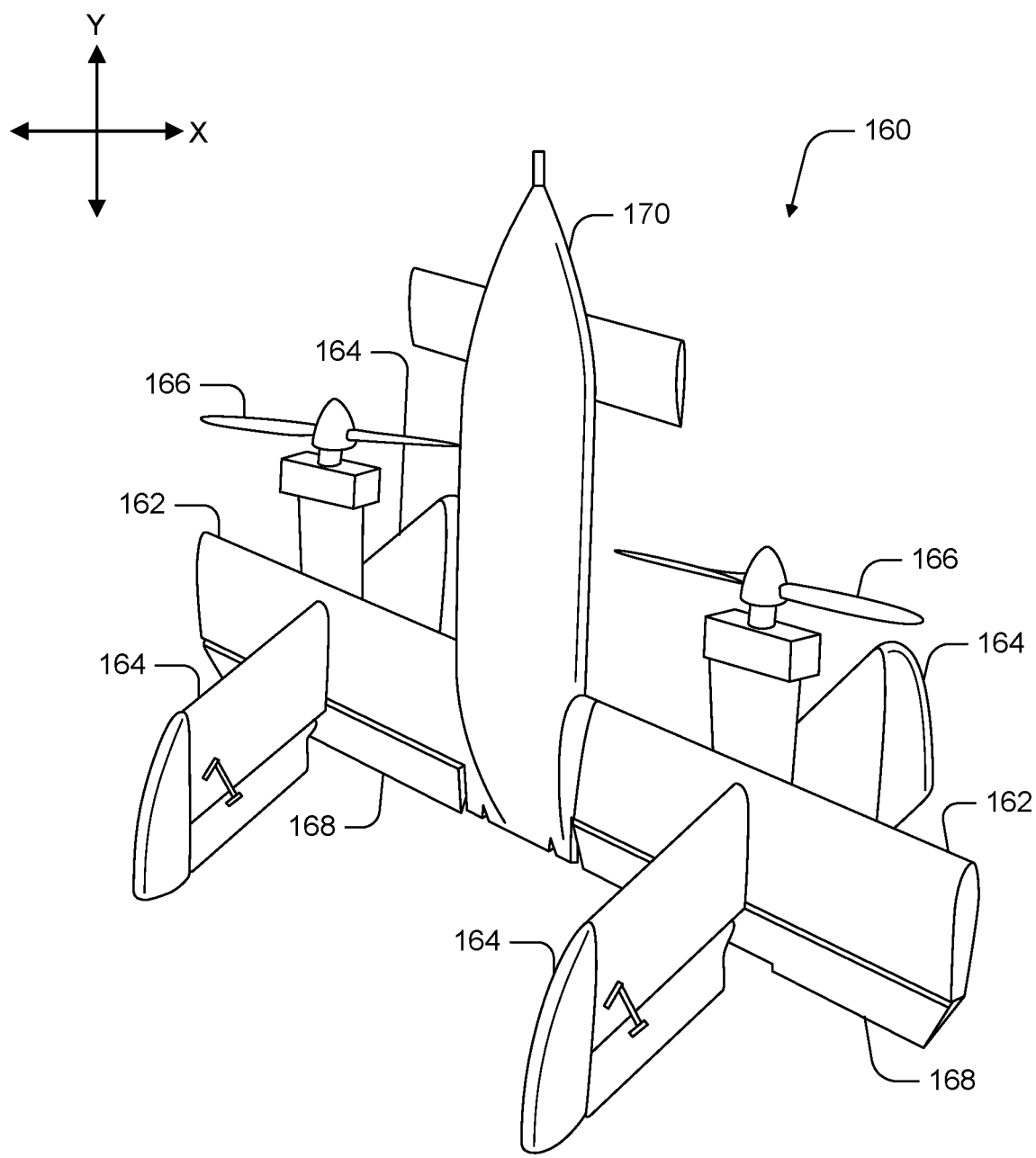
FIG. 1D is a simplified illustration of an unmanned aerial vehicle, according to example embodiments.

FIG. 1D shows an example of a tail-sitter UAV 160. In the illustrated example, the tail-sitter UAV 160 has fixed wings 162 to provide lift and allow the UAV 160 to glide horizontally (e.g., along the x-axis, in a position that is approximately perpendicular to the position shown in FIG. 1D). However, the fixed wings 162 also allow the tail-sitter UAV 160 to take off and land vertically on its own.

For example, at a launch site, the tail-sitter UAV 160 may be positioned vertically (as shown) with its fins 164 and/or wings 162 resting on the ground and stabilizing the UAV 160 in the vertical position. The tail-sitter UAV 160 may then take off by operating its propellers 166 to generate an upward thrust (e.g., a thrust that is generally along the y-axis). Once at a suitable altitude, the tail-sitter UAV 160 may use its flaps 168 to reorient itself in a horizontal position, such that its fuselage 170 is closer to being aligned with the x-axis than the y-axis. Positioned horizontally, the propellers 166 may provide forward thrust so that the tail-sitter UAV 160 can fly in a similar manner as a typical airplane.

Many variations on the illustrated fixed-wing UAVs are possible. For instance, fixed-wing UAVs may include more or fewer propellers, and/or may utilize a ducted fan or multiple ducted fans for propulsion. Further, UAVs with more wings (e.g., an "x-wing" configuration with four wings), with fewer wings, or even with no wings, are also possible.

Figure 1E:
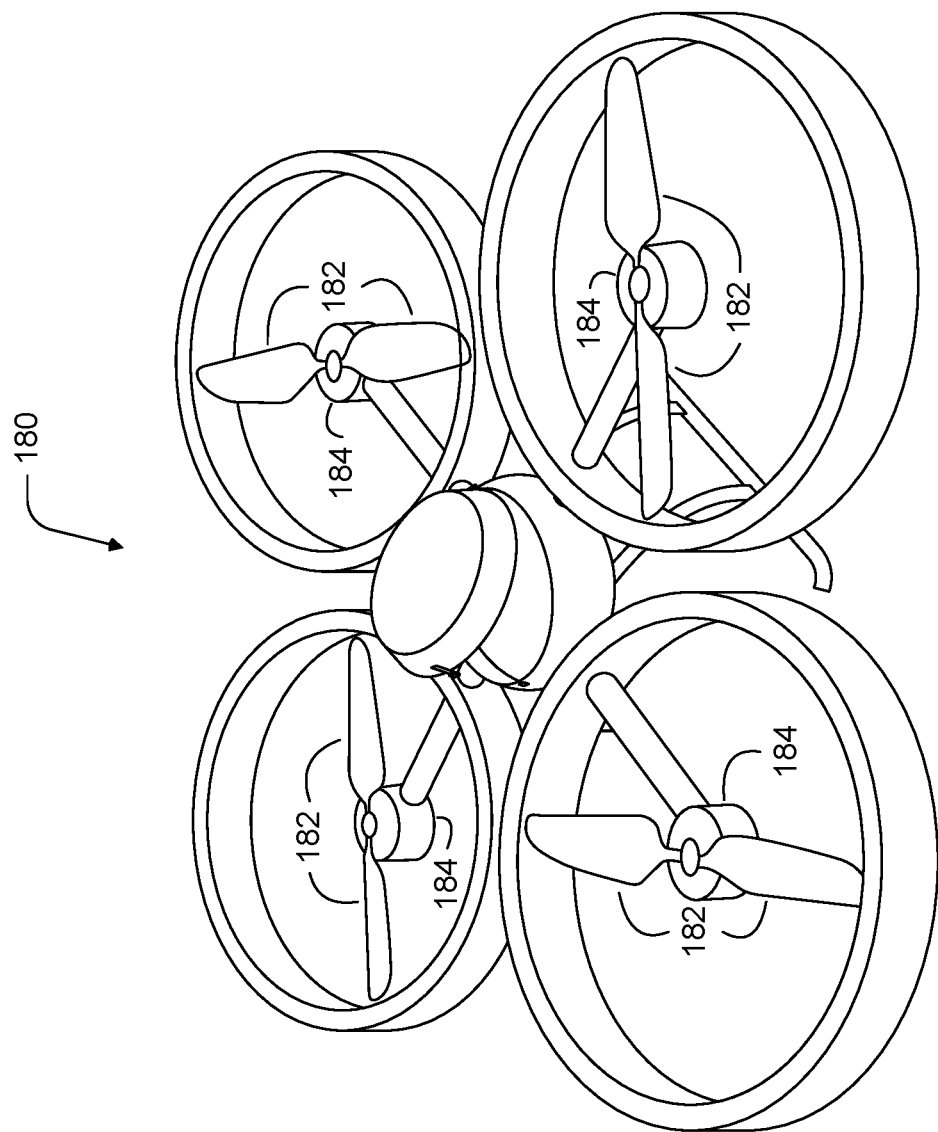
FIG. 1E is a simplified illustration of an unmanned aerial vehicle, according to example embodiments.

As noted above, some embodiments may involve other types of UAVs, in addition to or in the alternative to fixed-wing UAVs. For instance, FIG. 1E shows an example of a rotorcraft that is commonly referred to as a multicopter 180. The multicopter 180 may also be referred to as a quadcopter, as it includes four rotors 182. It should be understood that example embodiments may involve a rotorcraft with more or fewer rotors than the multicopter 180. For example, a helicopter typically has two rotors. Other examples with three or more rotors are possible as well. Herein, the term "multicopter" refers to any rotorcraft having more than two rotors, and the term "helicopter" refers to rotorcraft having two rotors.

Referring to the multicopter 180 in greater detail, the four rotors 182 provide propulsion and maneuverability for the multicopter 180. More specifically, each rotor 182 includes blades that are attached to a motor 184. Configured as such, the rotors 182 may allow the multicopter 180 to take off and land vertically, to maneuver in any direction, and/or to hover. Further, the pitch of the blades may be adjusted as a group and/or differentially, and may allow the multicopter 180 to control its pitch, roll, yaw, and/or altitude.

It should be understood that references herein to an "unmanned" aerial vehicle or UAV can apply equally to autonomous and semi-autonomous aerial vehicles. In an autonomous implementation, all functionality of the aerial vehicle is automated; e.g., pre-programmed or controlled via real-time computer functionality that responds to input from various sensors and/or pre-determined information. In a semi-autonomous implementation, some functions of an aerial vehicle may be controlled by a human operator, while other functions are carried out autonomously. Further, in some embodiments, a UAV may be configured to allow a remote operator to take over functions that can otherwise be controlled autonomously by the UAV. Yet further, a given type of function may be controlled remotely at one level of abstraction and performed autonomously at another level of abstraction. For example, a remote operator could control high level navigation decisions for a UAV, such as by specifying that the UAV should travel from one location to another (e.g., from a warehouse in a suburban area to a delivery address in a nearby city), while the UAV's navigation system autonomously controls more fine-grained navigation decisions, such as the specific route to take between the two locations, specific flight controls to achieve the route and avoid obstacles while navigating the route, and so on.

More generally, it should be understood that the example UAVs described herein are not intended to be limiting. Example embodiments may relate to, be implemented within, or take the form of any type of unmanned aerial vehicle.

III. ILLUSTRATIVE UAV COMPONENTS

Figure 2A:
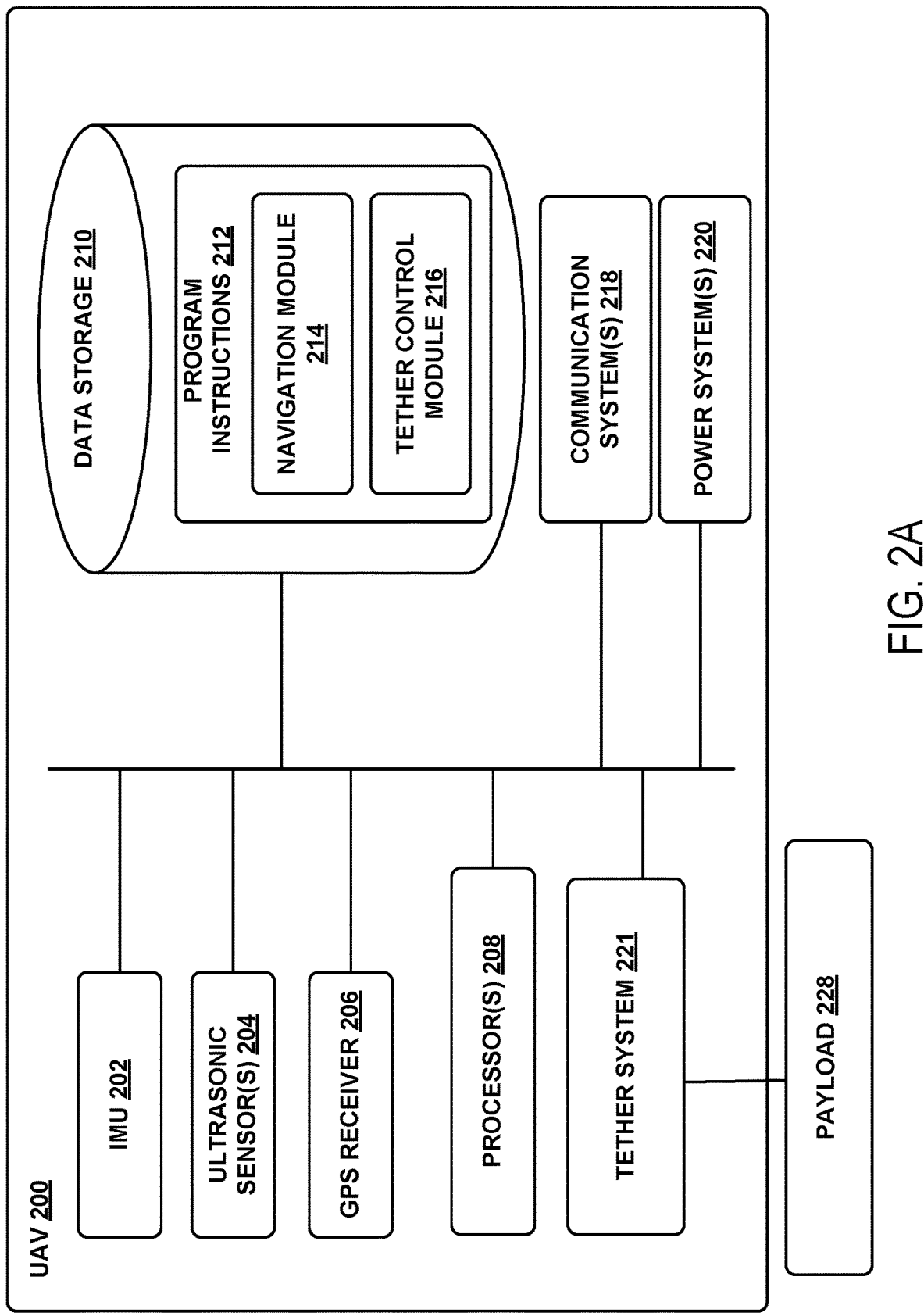
FIG. 2A is a simplified block diagram illustrating components of an unmanned aerial system, according to example embodiments.

FIG. 2A is a simplified block diagram illustrating components of a UAV 200, according to an example embodiment. UAV 200 may take the form of, or be similar in form to, one of the UAVs 100, 120, 140, 160, and 180 described in reference to FIGS. 1A-1E. However, UAV 200 may also take other forms.

UAV 200 may include various types of sensors, and may include a computing system configured to provide the functionality described herein. In the illustrated embodiment, the sensors of UAV 200 include an inertial measurement unit (IMU) 202, ultrasonic sensor(s) 204, and a GPS 206, among other possible sensors and sensing systems.

In the illustrated embodiment, UAV 200 also includes one or more processors 208. A processor 208 may be a general-purpose processor or a special purpose processor (e.g., digital signal processors, application specific integrated circuits, etc.). The one or more processors 208 can be configured to execute computer-readable program instructions 212 that are stored in the data storage 210 and are executable to provide the functionality of a UAV described herein.

The data storage 210 may include or take the form of one or more computer-readable storage media that can be read or accessed by at least one processor 208. The one or more computer-readable storage media can include volatile and/or non-volatile storage components, such as optical, magnetic, organic or other memory or disc storage, which can be integrated in whole or in part with at least one of the one or more processors 208. In some embodiments, the data storage 210 can be implemented using a single physical device (e.g., one optical, magnetic, organic or other memory or disc storage unit), while in other embodiments, the data storage 210 can be implemented using two or more physical devices.

As noted, the data storage 210 can include computer-readable program instructions 212 and perhaps additional data, such as diagnostic data of the UAV 200. As such, the data storage 210 may include program instructions 212 to perform or facilitate some or all of the UAV functionality described herein. For instance, in the illustrated embodiment, program instructions 212 include a navigation module 214 and a tether control module 216.

A. Sensors

In an illustrative embodiment, IMU 202 may include both an accelerometer and a gyroscope, which may be used together to determine an orientation of the UAV 200. In particular, the accelerometer can measure the orientation of the vehicle with respect to earth, while the gyroscope measures the rate of rotation around an axis. IMUs are commercially available in low-cost, low-power packages. For instance, an IMU 202 may take the form of or include a miniaturized MicroElectroMechanical System (MEMS) or a NanoElectroMechanical System (NEMS). Other types of IMUs may also be utilized.

An IMU 202 may include other sensors, in addition to accelerometers and gyroscopes, which may help to better determine position and/or help to increase autonomy of the UAV 200. Two examples of such sensors are magnetometers and pressure sensors. In some embodiments, a UAV may include a low-power, digital 3-axis magnetometer, which can be used to realize an orientation independent electronic compass for accurate heading information. However, other types of magnetometers may be utilized as well. Other examples are also possible. Further, note that a UAV could include some or all of the above-described inertia sensors as separate components from an IMU.

UAV 200 may also include a pressure sensor or barometer, which can be used to determine the altitude of the UAV 200. Alternatively, other sensors, such as sonic altimeters or radar altimeters, can be used to provide an indication of altitude, which may help to improve the accuracy of and/or prevent drift of an IMU.

In a further aspect, UAV 200 may include one or more sensors that allow the UAV to sense objects in the environment. For instance, in the illustrated embodiment, UAV 200 includes ultrasonic sensor(s) 204. Ultrasonic sensor(s) 204 can determine the distance to an object by generating sound waves and determining the time interval between transmission of the wave and receiving the corresponding echo off an object. A typical application of an ultrasonic sensor for unmanned vehicles or IMUs is low-level altitude control and obstacle avoidance. An ultrasonic sensor can also be used for vehicles that need to hover at a certain height or need to be capable of detecting obstacles. Other systems can be used to determine, sense the presence of, and/or determine the distance to nearby objects, such as a light detection and ranging (LIDAR) system, laser detection and ranging (LADAR) system, and/or an infrared or forward-looking infrared (FLIR) system, among other possibilities.

In some embodiments, UAV 200 may also include one or more imaging system(s). For example, one or more still and/or video cameras may be utilized by UAV 200 to capture image data from the UAV's environment. As a specific example, charge-coupled device (CCD) cameras or complementary metal-oxide-semiconductor (CMOS) cameras can be used with unmanned vehicles. Such imaging sensor(s) have numerous possible applications, such as obstacle avoidance, localization techniques, ground tracking for more accurate navigation (e.g., by applying optical flow techniques to images), video feedback, and/or image recognition and processing, among other possibilities.

UAV 200 may also include a GPS receiver 206. The GPS receiver 206 may be configured to provide data that is typical of well-known GPS systems, such as the GPS coordinates of the UAV 200. Such GPS data may be utilized by the UAV 200 for various functions. As such, the UAV may use its GPS receiver 206 to help navigate to the caller's location, as indicated, at least in part, by the GPS coordinates provided by their mobile device. Other examples are also possible.

B. Navigation and Location Determination

The navigation module 214 may provide functionality that allows the UAV 200 to, e.g., move about its environment and reach a desired location. To do so, the navigation module 214 may control the altitude and/or direction of flight by controlling the mechanical features of the UAV that affect flight (e.g., its rudder(s), elevator(s), aileron(s), and/or the speed of its propeller(s)).

In order to navigate the UAV 200 to a target location, the navigation module 214 may implement various navigation techniques, such as map-based navigation and localization-based navigation, for instance. With map-based navigation, the UAV 200 may be provided with a map of its environment, which may then be used to navigate to a particular location on the map. With localization-based navigation, the UAV 200 may be capable of navigating in an unknown environment using localization. Localization-based navigation may involve the UAV 200 building its own map of its environment and calculating its position within the map and/or the position of objects in the environment. For example, as a UAV 200 moves throughout its environment, the UAV 200 may continuously use localization to update its map of the environment. This continuous mapping process may be referred to as simultaneous localization and mapping (SLAM). Other navigation techniques may also be utilized.

In some embodiments, the navigation module 214 may navigate using a technique that relies on waypoints. In particular, waypoints are sets of coordinates that identify points in physical space. For instance, an air-navigation waypoint may be defined by a certain latitude, longitude, and altitude. Accordingly, navigation module 214 may cause UAV 200 to move from waypoint to waypoint, in order to ultimately travel to a final destination (e.g., a final waypoint in a sequence of waypoints).

In a further aspect, the navigation module 214 and/or other components and systems of the UAV 200 may be configured for "localization" to more precisely navigate to the scene of a target location. More specifically, it may be desirable in certain situations for a UAV to be within a threshold distance of the target location where a payload 228 is being delivered by a UAV (e.g., within a few feet of the target destination). To this end, a UAV may use a two-tiered approach in which it uses a more-general location-determination technique to navigate to a general area that is associated with the target location, and then use a more-refined location-determination technique to identify and/or navigate to the target location within the general area.

For example, the UAV 200 may navigate to the general area of a target destination where a payload 228 is being delivered using waypoints and/or map-based navigation. The UAV may then switch to a mode in which it utilizes a localization process to locate and travel to a more specific location. For instance, if the UAV 200 is to deliver a payload to a user's home, the UAV 200 may need to be substantially close to the target location in order to avoid delivery of the payload to undesired areas (e.g., onto a roof, into a pool, onto a neighbor's property, etc.). However, a GPS signal may only get the UAV 200 so far (e.g., within a block of the user's home). A more precise location-determination technique may then be used to find the specific target location.

Various types of location-determination techniques may be used to accomplish localization of the target delivery location once the UAV 200 has navigated to the general area of the target delivery location. For instance, the UAV 200 may be equipped with one or more sensory systems, such as, for example, ultrasonic sensors 204, infrared sensors (not shown), and/or other sensors, which may provide input that the navigation module 214 utilizes to navigate autonomously or semi-autonomously to the specific target location.

As another example, once the UAV 200 reaches the general area of the target delivery location (or of a moving subject such as a person or their mobile device), the UAV 200 may switch to a "fly-by-wire" mode where it is controlled, at least in part, by a remote operator, who can navigate the UAV 200 to the specific target location. To this end, sensory data from the UAV 200 may be sent to the remote operator to assist them in navigating the UAV 200 to the specific location.

As yet another example, the UAV 200 may include a module that is able to signal to a passer-by for assistance in either reaching the specific target delivery location; for example, the UAV 200 may display a visual message requesting such assistance in a graphic display, play an audio message or tone through speakers to indicate the need for such assistance, among other possibilities. Such a visual or audio message might indicate that assistance is needed in delivering the UAV 200 to a particular person or a particular location, and might provide information to assist the passer-by in delivering the UAV 200 to the person or location (e.g., a description or picture of the person or location, and/or the person or location's name), among other possibilities. Such a feature can be useful in a scenario in which the UAV is unable to use sensory functions or another location-determination technique to reach the specific target location. However, this feature is not limited to such scenarios.

In some embodiments, once the UAV 200 arrives at the general area of a target delivery location, the UAV 200 may utilize a beacon from a user's remote device (e.g., the user's mobile phone) to locate the person. Such a beacon may take various forms. As an example, consider the scenario where a remote device, such as the mobile phone of a person who requested a UAV delivery, is able to send out directional signals (e.g., via an RF signal, a light signal and/or an audio signal). In this scenario, the UAV 200 may be configured to navigate by "sourcing" such directional signals—in other words, by determining where the signal is strongest and navigating accordingly. As another example, a mobile device can emit a frequency, either in the human range or outside the human range, and the UAV 200 can listen for that frequency and navigate accordingly. As a related example, if the UAV 200 is listening for spoken commands, then the UAV 200 could utilize spoken statements, such as "I'm over here!" to source the specific location of the person requesting delivery of a payload.

In an alternative arrangement, a navigation module may be implemented at a remote computing device, which communicates wirelessly with the UAV 200. The remote computing device may receive data indicating the operational state of the UAV 200, sensor data from the UAV 200 that allows it to assess the environmental conditions being experienced by the UAV 200, and/or location information for the UAV 200. Provided with such information, the remote computing device may determine altitudinal and/or directional adjustments that should be made by the UAV 200 and/or may determine how the UAV 200 should adjust its mechanical features (e.g., its rudder(s), elevator(s), aileron (s), and/or the speed of its propeller(s)) in order to effectuate such movements. The remote computing system may then communicate such adjustments to the UAV 200 so it can move in the determined manner.

C. Communication Systems

In a further aspect, the UAV 200 includes one or more communication systems 218. The communications systems 218 may include one or more wireless interfaces and/or one or more wireline interfaces, which allow the UAV 200 to communicate via one or more networks. Such wireless interfaces may provide for communication under one or more wireless communication protocols, such as Bluetooth, WiFi (e.g., an IEEE 802.11 protocol), Long-Term Evolution (LTE), WiMAX (e.g., an IEEE 802.16 standard), a radio-frequency ID (RFID) protocol, near-field communication (NFC), and/or other wireless communication protocols. Such wireline interfaces may include an Ethernet interface, a Universal Serial Bus (USB) interface, or similar interface to communicate via a wire, a twisted pair of wires, a coaxial cable, an optical link, a fiber-optic link, or other physical connection to a wireline network.

In some embodiments, a UAV 200 may include communication systems 218 that allow for both short-range communication and long-range communication. For example, the UAV 200 may be configured for short-range communications using Bluetooth and for long-range communications under a CDMA protocol. In such an embodiment, the UAV 200 may be configured to function as a "hot spot;" or in other words, as a gateway or proxy between a remote support device and one or more data networks, such as a cellular network and/or the Internet. Configured as such, the UAV 200 may facilitate data communications that the remote support device would otherwise be unable to perform by itself.

For example, the UAV 200 may provide a WiFi connection to a remote device, and serve as a proxy or gateway to a cellular service provider's data network, which the UAV might connect to under an LTE or a 3G protocol, for instance. The UAV 200 could also serve as a proxy or gateway to a high-altitude balloon network, a satellite network, or a combination of these networks, among others, which a remote device might not be able to otherwise access.

D. Power Systems

In a further aspect, the UAV 200 may include power system(s) 220. The power system 220 may include one or more batteries for providing power to the UAV 200. In one example, the one or more batteries may be rechargeable and each battery may be recharged via a wired connection between the battery and a power supply and/or via a wireless charging system, such as an inductive charging system that applies an external time-varying magnetic field to an internal battery.

E. Payload

The UAV 200 can employ various systems and configurations in order to transport and deliver a payload 228. In some embodiments, the payload 228 can be attached to the UAV and located substantially outside of the UAV during some or all of a flight by the UAV. For example, the payload 228 may be tethered or otherwise releasably attached below the UAV during flight to a target location.

In order to deliver the payload, the UAV may include a tether system 221, which may be controlled by the tether control module 216 in order to lower the payload 228 to the ground while the UAV hovers above. The tether system 221 may include a tether, which is couplable to a payload 228 (e.g., a package). The tether 224 may be wound on a spool that is coupled to a motor 222 of the UAV (although passive implementations, without a motor, are also possible). The motor may be a DC motor (e.g., a servo motor) that can be actively controlled by a speed controller, although other motor configurations are possible. In some embodiments, the tether control module 216 can control the speed controller to cause the 222 to rotate the spool, thereby unwinding or retracting the tether and lowering or raising the payload coupling apparatus. In practice, a speed controller may output a desired operating rate (e.g., a desired RPM) for the spool, which may correspond to the speed at which the tether system should lower the payload towards the ground. The motor may then rotate the spool so that it maintains the desired operating rate (or within some allowable range of operating rates).

In order to control the motor via a speed controller, the tether control module 216 may receive data from a speed sensor (e.g., an encoder) configured to convert a mechanical position to a representative analog or digital signal. In particular, the speed sensor may include a rotary encoder that may provide information related to rotary position (and/or rotary movement) of a shaft of the motor or the spool coupled to the motor, among other possibilities. Moreover, the speed sensor may take the form of an absolute encoder and/or an incremental encoder, among others. So in an example implementation, as the motor causes rotation of the spool, a rotary encoder may be used to measure this rotation. In doing so, the rotary encoder may be used to convert a rotary position to an analog or digital electronic signal used by the tether control module 216 to determine the amount of rotation of the spool from a fixed reference angle and/or to an analog or digital electronic signal that is representative of a new rotary position, among other options. Other examples are also possible.

In some embodiments, a payload coupling component (e.g., a hook or another type of coupling component) can be configured to secure the payload 228 while being lowered from the UAV by the tether. The coupling apparatus or component and can be further configured to release the payload 228 upon reaching ground level via electrical or electro-mechanical features of the coupling component. The payload coupling component can then be retracted to the UAV by reeling in the tether using the motor.

In some implementations, the payload 228 may be passively released once it is lowered to the ground. For example, a payload coupling component may provide a passive release mechanism, such as one or more swing arms adapted to retract into and extend from a housing. An extended swing arm may form a hook on which the payload 228 may be attached. Upon lowering the release mechanism and the payload 228 to the ground via a tether, a gravitational force as well as a downward inertial force on the release mechanism may cause the payload 228 to detach from the hook allowing the release mechanism to be raised upwards toward the UAV. The release mechanism may further include a spring mechanism that biases the swing arm to retract into the housing when there are no other external forces on the swing arm. For instance, a spring may exert a force on the swing arm that pushes or pulls the swing arm toward the housing such that the swing arm retracts into the housing once the weight of the payload 228 no longer forces the swing arm to extend from the housing. Retracting the swing arm into the housing may reduce the likelihood of the release mechanism snagging the payload 228 or other nearby objects when raising the release mechanism toward the UAV upon delivery of the payload 228.

In another implementation, a payload coupling component may include a hook feature that passively releases the payload when the payload contacts the ground. For example, the payload coupling component may take the form of or include a hook feature that is sized and shaped to interact with a corresponding attachment feature (e.g., a handle or hole) on a payload taking the form of a container or tote. The hook may be inserted into the handle or hole of the payload container, such that the weight of the payload keeps the payload container secured to the hook feature during flight. However, the hook feature and payload container may be designed such that when the container contacts the ground and is supported from below, the hook feature slides out of the container's attachment feature, thereby passively releasing the payload container. Other passive release configurations are also possible.

Active payload release mechanisms are also possible. For example, sensors such as a barometric pressure based altimeter and/or accelerometers may help to detect the position of the release mechanism (and the payload) relative to the ground. Data from the sensors can be communicated back to the UAV and/or a control system over a wireless link and used to help in determining when the release mechanism has reached ground level (e.g., by detecting a measurement with the accelerometer that is characteristic of ground impact). In other examples, the UAV may determine that the payload has reached the ground based on a weight sensor detecting a threshold low downward force on the tether and/or based on a threshold low measurement of power drawn by the winch when lowering the payload.

Other systems and techniques for delivering a payload, in addition or in the alternative to a tethered delivery system are also possible. For example, a UAV 200 could include an air-bag drop system or a parachute drop system. Alternatively, a UAV 200 carrying a payload could simply land on the ground at a delivery location. Other examples are also possible.

F. Temperature Control Unit

In an embodiment, the UAV 200 may include a temperature control unit. The temperature control unit can include a temperature controlled compartment in which one or more items can be transported. In particular, the temperature control unit could actively control the temperature of the compartment. By actively controlling a temperature of the compartment, the temperature control unit can control a temperature of the item(s) being transported in the temperature-controlled compartment.

In an embodiment, the temperature control unit can be a "smart" unit that includes one or more electronic devices, such as processors, data storage, sensors, communication systems, power systems (e.g., batteries), etc. Such "smarts" enable the unit with various functionalities and can allow the unit to operate as a stand-alone device that can be coupled to the UAV 200.

Figure 2B:
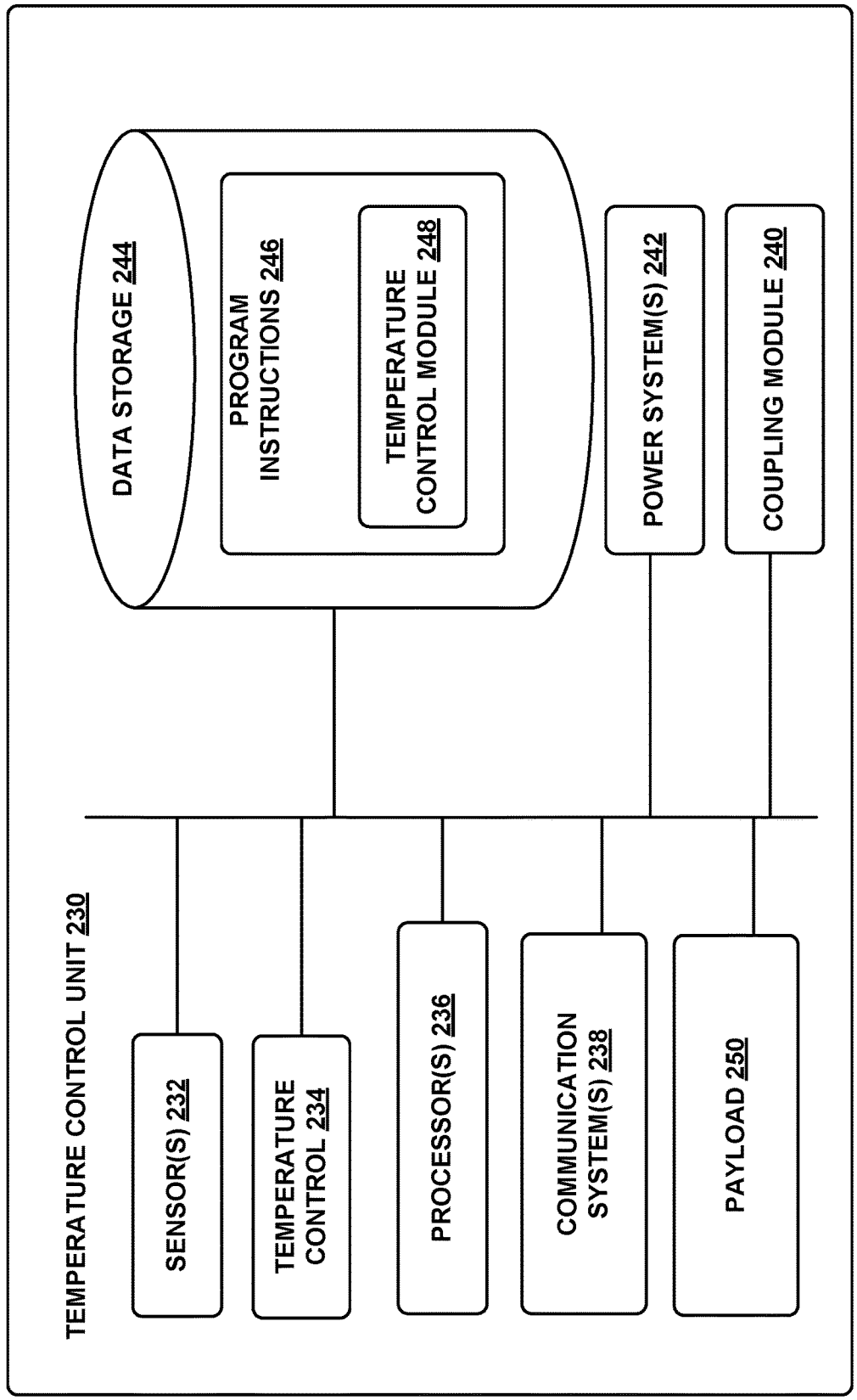
FIG. 2B is a simplified block diagram illustrating components of a temperature control unit, according to example embodiments.

FIG. 2B is a simplified block diagram illustrating components of a temperature control unit 230, according to an example embodiment. Within examples, the temperature control unit 230 can include one or more of the components illustrated in FIG. 2B, such as sensor(s) 232, temperature control components 234, processor(s) 236, communication system(s) 238, coupling module 240, power system(s) 242, data storage 244, program instructions 246, temperature control module 248, and payload 250. The temperature control unit 230 need not include all of these components, and can include additional components.

In an embodiment, the temperature control unit 230 can employ various systems and configurations in order to transport the payload 250 while maintaining a temperature of the payload at a particular temperature or at a temperature within a particular temperature range. For example, the temperature control unit can take the form of a device that is integrated within the UAV 200 and that includes a compartment in which items can be transported.

In another example, the temperature control unit 230 can take the form of a "package" or "packaging" in which the payload 250 can be placed to transport various goods to a target delivery location. In this example, the packaging can include various features that protect its contents from the environment, reduce aerodynamic drag on the system, and prevent the contents of the package from shifting during UAV flight.

Furthermore, the packaging can include an outer shell constructed of water-resistant cardboard, plastic, or any other lightweight and water-resistant material. Additionally, the packaging can include one or more materials that can insulate a compartment of the packaging. For example, the packaging can include fabricated thermal blankets or liners, molded expanded polystyrene foam (e.g., EPS, styrofoam, etc.), molded foams such as polyurethane, polyethylene, sheets of foamed plastics, Vacuum Insulated Panels (VIPs), bubble wrap or other gas filled panels, among other packaging materials and structures.

Furthermore, in order to reduce drag, the packaging may feature smooth surfaces with an aerodynamically shaped front that reduces the frontal cross-sectional area. Further, the sides of the packaging may taper from a wide bottom to a narrow top, which allows the packaging to serve as a narrow pylon that reduces interference effects on the wing(s) of the UAV. This may move some of the frontal area and volume of the packaging away from the wing(s) of the UAV, thereby preventing the reduction of lift on the wing(s) cause by the packaging. Yet further, in some embodiments, the outer shell of the packaging can be constructed from a single sheet of material in order to reduce air gaps or extra material, both of which may increase drag on the system. Additionally or alternatively, the packaging can include a stabilizer to dampen package flutter. This reduction in flutter can allow the packaging to have a less rigid connection to the UAV and may cause the contents of the packaging to shift less during flight.

In an embodiment, the coupling module 240 can be used to couple the temperature control unit 230 to the UAV 200. The coupling module 240 can include various electrical and/or mechanical connectors or elements that electrically and/or mechanically couple the temperature control unit 230 to the UAV 200. By way of example, the coupling module 240 can include electrical pins that can be used to engage complementary holding pins in the UAV 200 in order to electrically couple to the UAV 200. Being electrically coupled to the UAV 200 allows the temperature control unit 230 to interface with the UAV 200. For instance, as explained below, the payload 228 can send various signals, such as communication or power signals, via the coupling module 240. Other example coupling modules include docks, plugs, sockets, jacks, among other types of connectors. In an example, a person or robotic device that is coupling the temperature control unit 230 to the UAV 200 can use the coupling modules 240 to electrically and/or mechanically couple the temperature control unit 230 to the UAV 200.

The communications systems 238 can include one or more wireless interfaces and/or one or more wireline interfaces, which allow the unit 230 to communicate via one or more networks. Such wireless interfaces can provide for communication under one or more wireless communication protocols, such as Bluetooth, WiFi (e.g., an IEEE 802.11 protocol), Long-Term Evolution (LTE), WiMAX (e.g., an IEEE 802.16 standard), a radio-frequency ID (RFID) protocol, near-field communication (NFC), and/or other wireless communication protocols. In some examples, the unit 230 can include low power communication protocols such a Bluetooth Low Energy (BLE). The wireline interfaces can include an Ethernet interface, a Universal Serial Bus (USB) interface, or similar interface to communicate via a wire, a twisted pair of wires, a coaxial cable, an optical link, a fiber-optic link, or other physical connection to a wireline network. Within examples, the communication systems 238 may establish a communication link with the communication systems 218 of the UAV 200. For instance, the wireline communication interfaces can exchange signals with the UAV 200 via an electrical interface provided by the coupling module 240.

The one or more processors 236 can be general-purpose processors or special purpose processors (e.g., digital signal processors, application specific integrated circuits, etc.). The one or more processors 236 can be configured to execute computer-readable program instructions 246 that are stored in the data storage 244 and are executable to provide the unit 230 with various functionalities, such as the temperature-control functionality described herein.

The data storage 244 can include or take the form of one or more computer-readable storage media that can be read or accessed by the at least one processor 236. The one or more computer-readable storage media can include volatile and/or non-volatile storage components, such as optical, magnetic, organic or other memory or disc storage, which can be integrated in whole or in part with at least one of the one or more processors 236. In some embodiments, the data storage 244 can be implemented using a single physical device (e.g., one optical, magnetic, organic or other memory or disc storage unit), while in other embodiments, the data storage 244 can be implemented using two or more physical devices.

As noted, the data storage 244 can include computer-readable program instructions 246 and perhaps additional data, such as temperature, battery usage, and/or location data of the temperature control unit 230. The program instructions 246 can be used to perform or facilitate some or all of the functionality described herein. For instance, in the illustrated embodiment, the program instructions 246 include a temperature control module 248 that can be used to perform or facilitate the temperature control functionality described herein.

Additionally, the temperature control unit 230 can include power system(s) 242. In an embodiment, the power system (s) can include one or more energy storage devices (e.g., batteries) that can provide power to the temperature control unit 230. In one example, the one or more energy storage devices can be rechargeable. In this example, each energy storage device can be recharged via a wired connection between the energy storage device and a power supply and/or via a wireless charging system, such as an inductive charging system that applies an external time-varying magnetic field to an internal energy storage device. In some examples, the energy storage devices can be used to power the various components of the temperature control unit 230. In other examples, the temperature control unit 230 may not include the power system(s) 242 and can rely on the battery of the UAV 200 for power.

Within examples, the power system(s) 242 can include a standard charging port (e.g., a USB port) such that an individual (e.g., a recipient of the item) that receives the UAV 200 can easily charge the energy storage devices for further use of the temperature control unit 230. For instance, as explained below, in the example where the temperature control unit 230 takes the form of packaging, after recharging the temperature control unit 230, the individual can use the temperature control unit 230 to return items (e.g., temperature sensitive items) to the item-provider via a UAV 200.

In an embodiment, the one or more energy storage devices can be used to provide power to the UAV 200, perhaps through a wired connection via the coupling module 240 or through a wireless power system (e.g., an inductive system). The energy storage device power can be used to either power the UAV 200 directly or can be used to recharge batteries of the UAV 200. As such, the temperature control unit 230 can function as a back-up or secondary power source for the UAV 200.

In an embodiment, different temperature control units can have energy storage devices with different energy capacities. For example, the temperature control units can be organized into tiers based on energy capacity, where each tier has a particular energy storage capacity or a range of energy storage capacities. Further, the different tiers could have different features, perhaps as a result of having different energy storage capacities. For example, because energy storage devices of different capacities have different weights, the weights of the temperature control units of different tiers could also be different. As explained below, due to the different tiers having different properties, the temperature control unit tier that is selected for a particular task could depend on one or more factors. As such, an ATSP that has access to the different tiers could determine for a particular transport task a temperature control unit from one of the different tiers.

As stated above, one of the functionalities of the temperature control unit 230 is temperature control of a compartment of the temperature control unit 230 and/or temperature control of an item being transported in the compartment of the temperature control unit 230. To enable this functionality, the temperature control unit 230 can include temperature control components. The temperature control functionality, in addition to controlling the temperature of the compartment, can also involve monitoring the temperature of the compartment and/or the temperature of an item being transported in the compartment. The one or more components that facilitate the payload's temperature-control functionality include the sensors 232 and the temperature control components 234.

In an embodiment, the temperature control components 234 can include components that can cool or heat the compartment of the temperature control unit 230 or an item transported in the compartment. For example, the temperature control elements 234 can include components such as cooling elements, wire mesh heating elements, phase change materials, insulation materials, evaporative coolers, thermo-electric coolers (e.g., Peltier coolers), vapor compression refrigeration elements, among other examples.

The sensor(s) 232 could include temperature sensors such as thermistors, thermocouples, semiconductor based sensors, resistance temperature detectors, probe-type sensors, non-contact type sensors (e.g., infrared sensors), among other examples. Within examples, the sensor(s) 232 can be installed in the interior and/or exterior of the temperature control unit 230. The sensor(s) 232 can be used to monitor the temperature of an environment of the UAV 200 and/or the compartment of the temperature control unit 230. Additionally and/or alternatively, the sensor(s) 230 can be used to monitor the temperature of an item being transported in the compartment.

In an embodiment, the temperature control unit 230 can receive instructions from the UAV 200, perhaps via the communication system(s) 238, to set a temperature of the compartment to a specified temperature or to maintain a temperature of the compartment within a specified temperature range. In response to receiving the instructions, the one or more processors 236 can execute the program instructions 246 in order to enable the temperature control module 248. The temperature control module 248 can maintain the temperature of the compartment at the specified temperature or at a temperature within the specified temperature range. Within examples, the temperature control module 248 can use a temperature control feedback loop that feeds back a current temperature of the compartment to the temperature control module 248. Specifically, the temperature control module 248 can use the current temperature of the compartment in order to determine how to adjust the temperature control components 234 in order to maintain the temperature at the specified temperature or within the specified temperature range.

In some examples, the temperature control unit 230 can be configured to couple to one or more modular components, perhaps an imaging device. By having the capability of coupling to modular components, the temperature control unit 230 can be equipped with components that are useful for a particular task, such as a particular transport task. For instance, in addition to transporting the items, the temperature control unit 230 can be equipped with an imaging device in order to capture images of the environment (e.g., below the UAV 200) along the UAV 200's delivery path.

IV. ILLUSTRATIVE UAV DEPLOYMENT SYSTEMS

Figure 3:
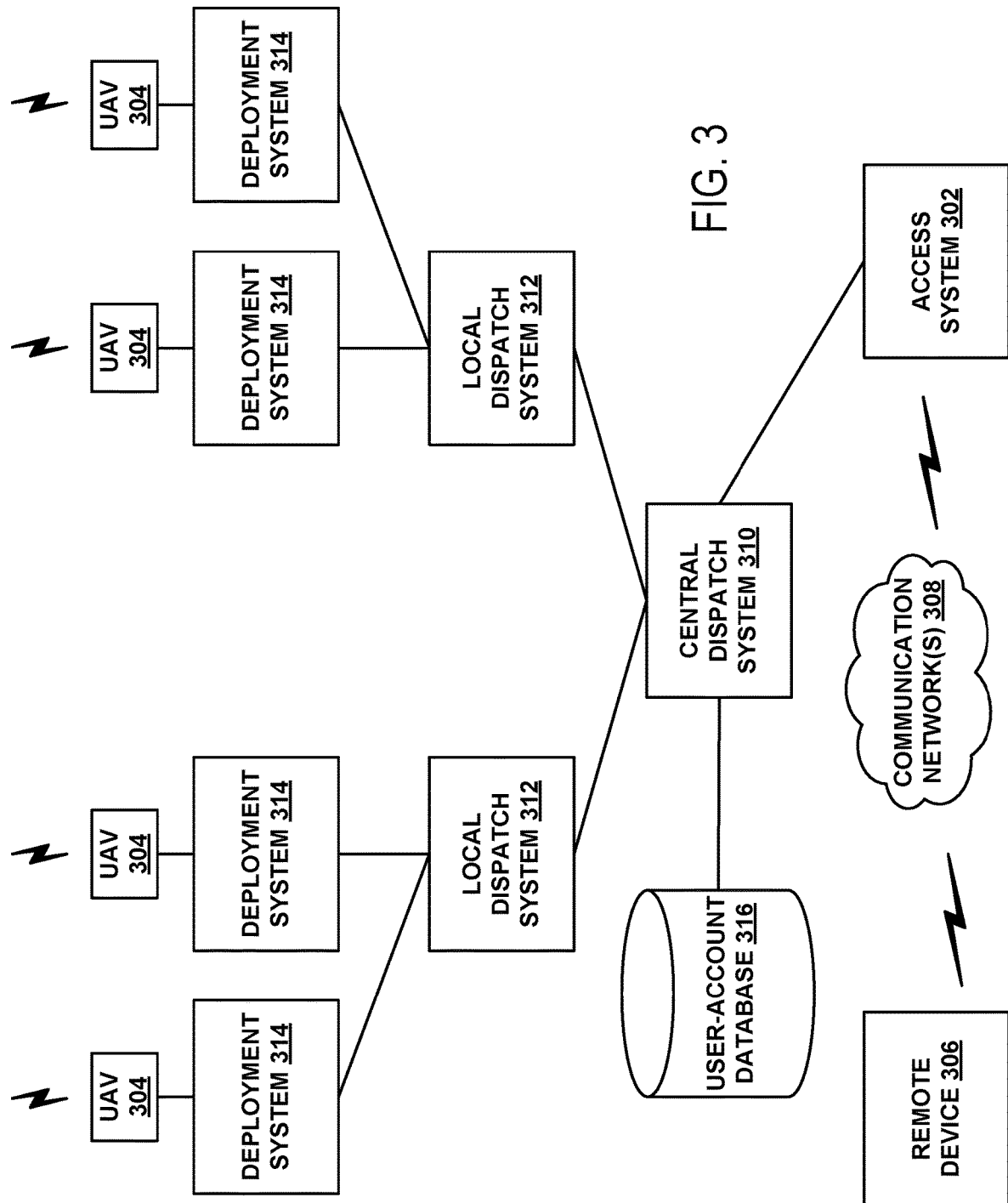
FIG. 3 is a simplified block diagram illustrating a distributed UAV system, according to example embodiments.

UAV systems may be implemented in order to provide various UAV-related services. In particular, UAVs may be provided at a number of different launch sites with infrastructure for communication with regional and/or central control systems. Such a distributed UAV system may allow UAVs to be quickly deployed to provide services across a large geographic area (e.g., that is much larger than the flight range of any single UAV). For example, UAVs capable of carrying payloads may be distributed at a number of launch sites across a large geographic area (possibly even throughout an entire country, or even worldwide), in order to provide on-demand transport of various items to locations throughout the geographic area. FIG. 3 is a simplified block diagram illustrating a distributed UAV system 300, according to an example embodiment.

In the illustrative UAV system 300, an access system 302 may allow for interaction with, control of, and/or utilization of a network of UAVs 304. In some embodiments, an access system 302 may be a computing system that allows for human-controlled dispatch of UAVs 304. As such, the control system may include or otherwise provide a user interface through which a user can access and/or control the UAVs 304.

In some embodiments, dispatch of the UAVs 304 may additionally or alternatively be accomplished via one or more automated processes. For instance, the access system 302 may dispatch one of the UAVs 304 to transport a payload to a target location, and the UAV may autonomously navigate to the target location by utilizing various on-board sensors, such as a GPS receiver and/or other various navigational sensors.

Further, the access system 302 may provide for remote operation of a UAV. For instance, the access system 302 may allow an operator to control the flight of a UAV via its user interface. As a specific example, an operator may use the access system 302 to dispatch a UAV 304 to a target location. The UAV 304 may then autonomously navigate to the general area of the target location. At this point, the operator may use the access system 302 to take control of the UAV 304 and navigate the UAV to the target location (e.g., to a particular person to whom a payload is being transported). Other examples of remote operation of a UAV are also possible.

In an illustrative embodiment, the UAVs 304 may take various forms. For example, each of the UAVs 304 may be a UAV such as those illustrated in FIG. 1, 2, 3, or 4. However, UAV system 300 may also utilize other types of UAVs without departing from the scope of the invention. In some implementations, all of the UAVs 304 may be of the same or a similar configuration. However, in other implementations, the UAVs 304 may include a number of different types of UAVs. For instance, the UAVs 304 may include a number of types of UAVs, with each type of UAV being configured for a different type or types of payload delivery capabilities.

The UAV system 300 may further include a remote device 306, which may take various forms. Generally, the remote device 306 may be any device through which a direct or indirect request to dispatch a UAV can be made. (Note that an indirect request may involve any communication that may be responded to by dispatching a UAV, such as requesting a package delivery). In an example embodiment, the remote device 306 may be a mobile phone, tablet computer, laptop computer, personal computer, or any network-connected computing device. Further, in some instances, the remote device 306 may not be a computing device. As an example, a standard telephone, which allows for communication via plain old telephone service (POTS), may serve as the remote device 306. Other types of remote devices are also possible.

Further, the remote device 306 may be configured to communicate with access system 302 via one or more types of communication network(s) 308. For example, the remote device 306 may communicate with the access system 302 (or a human operator of the access system 302) by communicating over a POTS network, a cellular network, and/or a data network such as the Internet. Other types of networks may also be utilized.

In some embodiments, the remote device 306 may be configured to allow a user to request pick-up of one or more items from a certain source location and/or delivery of one or more items to a desired location. For example, a user could request UAV delivery of a package to their home via their mobile phone, tablet, or laptop. As another example, a user could request dynamic delivery to wherever they are located at the time of delivery. To provide such dynamic delivery, the UAV system 300 may receive location information (e.g., GPS coordinates, etc.) from the user's mobile phone, or any other device on the user's person, such that a UAV can navigate to the user's location (as indicated by their mobile phone).

In some embodiments, a business user (e.g., a restaurant) could utilize one or more remote devices 306 to request that a UAV be dispatched to pick-up one or more items (e.g., a food order) from a source location (e.g., the restaurant's address), and then deliver the one or more items to a target location (e.g., a customer's address). Further, in such embodiments, there may be a number of remote devices 306 associated with a common item-provider account (e.g., an account used by multiple employees and/or owners of a particular restaurant). Additionally, in such embodiments, a remote device 306 may be utilized to send item-provider submissions to a transport-provider computing system (e.g., central dispatch system 310 and or local dispatch system 312), which each indicate a respective quantitative measure for a given amount of UAV transport service at a given future time. For example, remote device 306 may be utilized to generate and send an item-provider submission that specifies a level of desired UAV transport services (e.g., number and/or rate of expected UAV delivery flights), and/or a monetary value corresponding to the item provider's need for UAV transport services, at a particular time or during a particular period of time in the future.

In an illustrative arrangement, the central dispatch system 310 may be a server or group of servers, which is configured to receive dispatch messages requests and/or dispatch instructions from the access system 302. Such dispatch messages may request or instruct the central dispatch system 310 to coordinate the deployment of UAVs to various target locations. The central dispatch system 310 may be further configured to route such requests or instructions to one or more local dispatch systems 312. To provide such functionality, the central dispatch system 310 may communicate with the access system 302 via a data network, such as the Internet or a private network that is established for communications between access systems and automated dispatch systems.

In the illustrated configuration, the central dispatch system 310 may be configured to coordinate the dispatch of UAVs 304 from a number of different local dispatch systems 312. As such, the central dispatch system 310 may keep track of which UAVs 304 are located at which local dispatch systems 312, which UAVs 304 are currently available for deployment, and/or which services or operations each of the UAVs 304 is configured for (in the event that a UAV fleet includes multiple types of UAVs configured for different services and/or operations). Additionally or alternatively, each local dispatch system 312 may be configured to track which of its associated UAVs 304 are currently available for deployment and/or are currently in the midst of item transport.

In some cases, when the central dispatch system 310 receives a request for UAV-related service (e.g., transport of an item) from the access system 302, the central dispatch system 310 may select a specific UAV 304 to dispatch. The central dispatch system 310 may accordingly instruct the local dispatch system 312 that is associated with the selected UAV to dispatch the selected UAV. The local dispatch system 312 may then operate its associated deployment system 314 to launch the selected UAV. In other cases, the central dispatch system 310 may forward a request for a UAV-related service to a local dispatch system 312 that is near the location where the support is requested and leave the selection of a particular UAV 304 to the local dispatch system 312.

In an example configuration, the local dispatch system 312 may be implemented as a computing system at the same location as the deployment system(s) 314 that it controls. For example, the local dispatch system 312 may be implemented by a computing system installed at a building, such as a warehouse, where the deployment system(s) 314 and UAV(s) 304 that are associated with the particular local dispatch system 312 are also located. In other embodiments, the local dispatch system 312 may be implemented at a location that is remote to its associated deployment system (s) 314 and UAV(s) 304.

Numerous variations on and alternatives to the illustrated configuration of the UAV system 300 are possible. For example, in some embodiments, a user of the remote device 306 could request delivery of a package directly from the central dispatch system 310. To do so, an application may be implemented on the remote device 306 that allows the user to provide information regarding a requested delivery, and generate and send a data message to request that the UAV system 300 provide the delivery. In such an embodiment, the central dispatch system 310 may include automated functionality to handle requests that are generated by such an application, evaluate such requests, and, if appropriate, coordinate with an appropriate local dispatch system 312 to deploy a UAV.

Further, some or all of the functionality that is attributed herein to the central dispatch system 310, the local dispatch system(s) 312, the access system 302, and/or the deployment system(s) 314 may be combined in a single system, implemented in a more complex system (e.g., having more layers of control), and/or redistributed among the central dispatch system 310, the local dispatch system(s) 312, the access system 302, and/or the deployment system(s) 314 in various ways.

Yet further, while each local dispatch system 312 is shown as having two associated deployment systems 314, a given local dispatch system 312 may alternatively have more or fewer associated deployment systems 314. Similarly, while the central dispatch system 310 is shown as being in communication with two local dispatch systems 312, the central dispatch system 310 may alternatively be in communication with more or fewer local dispatch systems 312.

In a further aspect, the deployment systems 314 may take various forms. In some implementations, some or all of the deployment systems 314 may be a structure or system that passively facilitates a UAV taking off from a resting position to begin a flight. For example, some or all of the deployment systems 314 may take the form of a landing pad, a hangar, and/or a runway, among other possibilities. As such, a given deployment system 314 may be arranged to facilitate deployment of one UAV 304 at a time, or deployment of multiple UAVs (e.g., a landing pad large enough to be utilized by multiple UAVs concurrently).

Additionally or alternatively, some or all of deployment systems 314 may take the form of or include systems for actively launching one or more of the UAVs 304. Such launch systems may include features that provide for an automated UAV launch and/or features that allow for a human-assisted UAV launch. Further, a given deployment system 314 may be configured to launch one particular UAV 304, or to launch multiple UAVs 304.

Note that deployment systems 314 may also be configured to passively facilitate and/or actively assist a UAV when landing. For example, the same landing pad could be used for take-off and landing. Additionally or alternatively, a deployment system could include a robotic arm operable to receive an incoming UAV. A deployment system 314 could also include other structures and/or systems to assist and/or facilitate UAV landing processes. Further, structures and/or systems to assist and/or facilitate UAV landing processes may be implemented as separate structures and/or systems, so long as UAVs can move or be moved from a landing structure or system to a deployment system 314 for re-deployment.

The deployment systems 314 may further be configured to provide additional functions, including for example, diagnostic-related functions such as verifying system functionality of the UAV, verifying functionality of devices that are housed within a UAV (e.g., a payload delivery apparatus), and/or maintaining devices or other items that are housed in the UAV (e.g., by monitoring a status of a payload such as its temperature, weight, etc.).

In some embodiments, local dispatch systems 312 (along with their respective deployment system(s) 314 may be strategically distributed throughout an area such as a city. For example, local dispatch systems 312 may be strategically distributed such that each local dispatch systems 312 is proximate to one or more payload pickup locations (e.g., near a restaurant, store, or warehouse). However, the local dispatch systems 312 may be distributed in other ways, depending upon the particular implementation.

As an additional example, kiosks that allow users to transport packages via UAVs may be installed in various locations. Such kiosks may include UAV launch systems, and may allow a user to provide their package for loading onto a UAV and pay for UAV shipping services, among other possibilities. Other examples are also possible.

In a further aspect, the UAV system 300 may include or have access to a user-account database 316. The user-account database 316 may include data for a number of user accounts, and which are each associated with one or more person. For a given user account, the user-account database 316 may include data related to or useful in providing UAV-related services. Typically, the user data associated with each user account is optionally provided by an associated user and/or is collected with the associated user's permission.

Further, in some embodiments, a person may be required to register for a user account with the UAV system 300, if they wish to be provided with UAV-related services by the UAVs 304 from UAV system 300. As such, the user-account database 316 may include authorization information for a given user account (e.g., a user name and password), and/or other information that may be used to authorize access to a user account.

In some embodiments, an entity (e.g., a person or business) may associate one or more of their devices with their user account, such that they can access the services of UAV system 300. For example, when a person uses an associated mobile phone to, e.g., place a call to an operator of the access system 302 or send a message requesting a UAV-related service to a dispatch system, the phone may be identified via a unique device identification number, and the call or message may then be attributed to the associated user account. Other examples are also possible.

Additionally or alternatively, an item provider that wishes to deliver their products using UAV transport services provided by an ATSP to deliver, can register for an item-provider account with the UAV system 300. As such, the user-account database 316 may include authorization information for a given item-provider account (e.g., one or more user name and password combinations), and/or other information that may be used to authorize access to a given item-provider account. Alternatively, data for item-provider accounts may be kept in a separate database from recipient user accounts. Other data structures and storage configurations for storing such account data are also possible.

V. UAV TRANSPORT SERVICES WITH SEPARATELY LOCATED ITEM PROVIDERS AND UAV HUBS

As noted above, an ATSP can be a separate entity from the entity or entities that provide the items being transported and/or interface with the recipients who request delivery of these items. For example, a company that operates a fleet of UAVs configured for item delivery may provide delivery services for third-party entities, such as restaurants, clothing stores, grocery stores, and other "brick and mortar" and/or online retailers, among other possibilities. These third-party entities may have accounts with the UAV transport service provider, via which the third-parties can request and/or purchase UAV transport services from the transport service provider. Further, the third-party entities could interface with recipients (e.g., customers) directly, or through computing systems (e.g., applications and/or server systems) provided by the UAV transport service provider.

Figure 4:
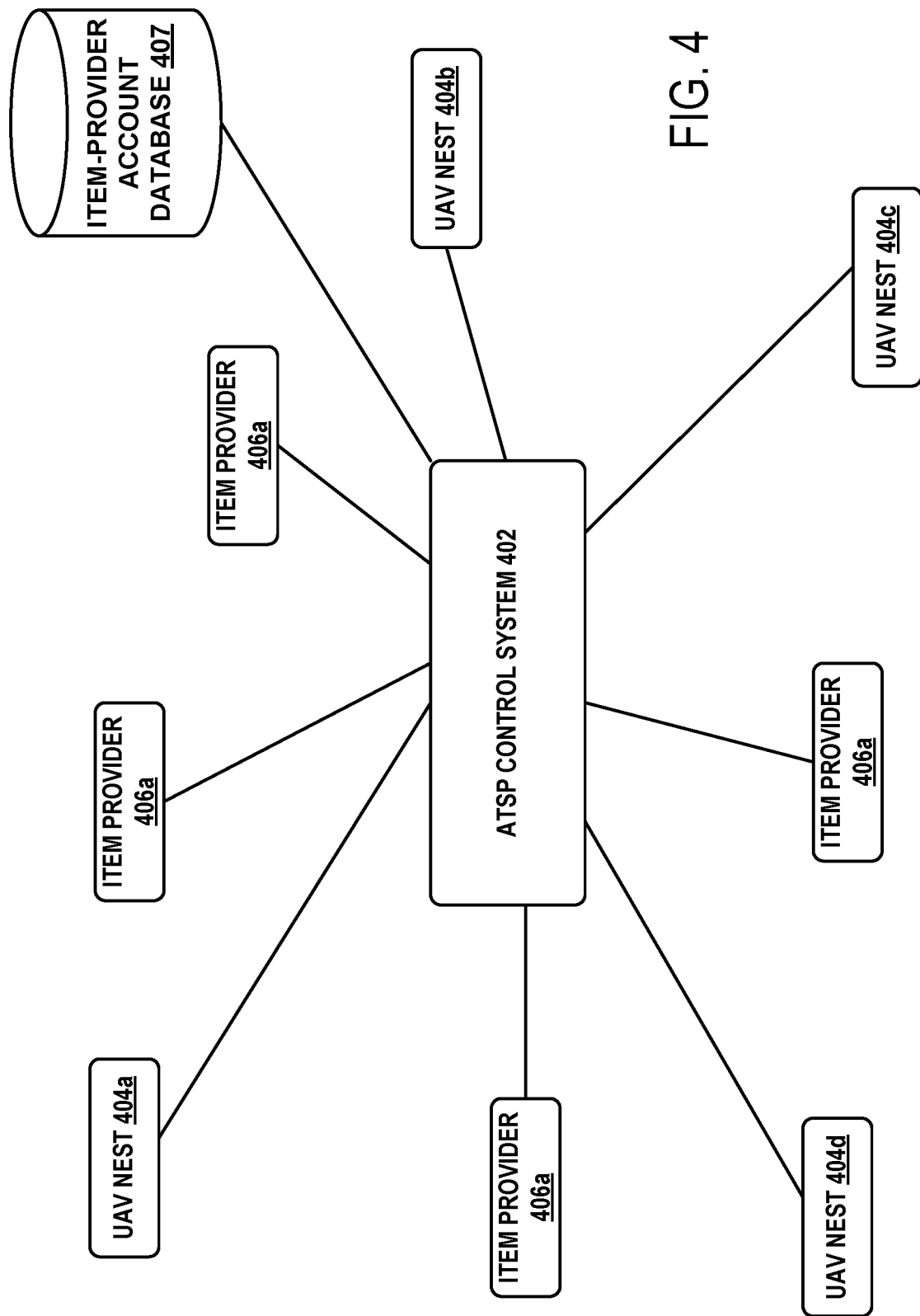
FIG. 4 is a block diagram showing an example arrangement for a transport provider system, according to example implementations.

FIG. 4 is a block diagram showing an example arrangement for an aerial transport provider control system 402, which coordinates UAV transport services for a plurality of item providers that are located remotely from the service provider's dispatch locations, and served by a plurality of UAV hubs at various locations. As shown, an aerial transport service provider (ATSP) 402 may be communicatively coupled to UAV nests 404a to 404d, and communicatively coupled to item-provider computing systems 406a to 406d. Such communicative couplings may be implemented using various types of wired and/or wireless communication protocols and networks.

Each UAV nest 404a to 404d is a facility where UAVs can be stored for at least a short period of time, and from which UAVs can begin carrying out a UAV transport task (e.g., where UAVs can take off). In some implementations, some or all of UAV nests 404a to 404d may take the form of a local dispatch system and one or more deployment systems, such as those described in reference to FIG. 3 above. Of course, some or all UAV nests 404a to 404d could also take other forms and/or perform different functions.

Each item-provider computing system 406a to 406d may be associated with a different item-provider account. As such, a given item-provider computing system 406a to 406d may include one or more computing devices that are authorized to access the corresponding item-provider account with ATSP 402. Further, ATSP 402 may store data for item-provider accounts in an item-provider account database 407.

In practice, a given item-provider computing system 406a to 406d may include one or more remote computing devices (e.g., such as one or more remote devices 306 described in reference to FIG. 3), which have logged in to or otherwise been authorized to access the same item-provider account (e.g., cell phones, laptops, and/or computing devices of a business's employees). Additionally or alternatively, an item-provider computing system 406a to 406d may be implemented with less of an ad-hoc approach; e.g., with one or more dedicated user-interface terminals installed at the item provider's facilities. Other types of item-provider computing systems are also possible.

In order to provide UAV transport services to various item providers in an efficient and flexible manner, a UAV transport service provider 402 may dynamically assign different UAVs to transport tasks for different item providers based on demand and/or other factors, rather than permanently assigning each UAV to a particular item provider. As such, the particular UAV or UAVs that carry out transport tasks for a given third-party item provider may vary over time.

The dynamic assignment of UAVs to flights for a number of different item providers can help a UAV transport service provider to more efficiently utilize a group of UAVs (e.g., by reducing unnecessary UAV downtime), as compared to an arrangement where specific UAVs are permanently assigned to specific item providers. More specifically, to dynamically assign UAVs to transport requests from third-party item providers, the UAV transport service provider 402 can dynamically redistribute UAVs amongst a number of UAV deployment locations (which may be referred to as, e.g., "hubs" or "nests") through a service area, according to time-varying levels of demand at various locations or subareas within the service area.

With such an arrangement, a delivery flight may involve the additional flight leg to fly from the UAV hub to the item-provider's location to pick up the item or items for transport, before flying to the delivery location, as compared to an arrangement where delivery UAVs are stationed at the source location for items (such as a distributor or retailer warehouse or a restaurant). While the flight leg between the UAV hub and a loading location has associated costs, these costs can be offset by more efficient use of each UAV (e.g., more flights, and less unnecessary ground time, in a given period of time), which in turn can allow for a lesser number of UAVs to be utilized for a given number of transport tasks.

VI. UAV TIERS BASED ON BATTERY CAPACITY

In a UAV fleet, different UAVs can have different specifications or features. For example, some UAVs of the fleet may each include a temperature control unit. And in an embodiment, the UAVs of the fleet can be categorized into tiers, where each tier includes UAVs that share a particular feature. For instance, in the example in which some UAVs have temperature control units, a possible tier is one that includes UAVs with temperature control units.

In an embodiment, the ATSP can include tiers of UAVs based on the battery capacity of the UAVs, where each tier includes UAVs with battery capacities that fall within a specified range. For example, the fleet can include two tiers of UAVs: a first tier with "large" battery capacities greater than a threshold battery capacity, and a second tier with "small" battery capacities less than or equal to the threshold battery capacity. Note that in some examples, the number of tiers based on battery capacity can be greater than two tiers, perhaps three or four tiers.

In an embodiment, UAVs of the first tier can be configured to travel for longer distances than UAVs of the second tier. That is, UAVs of the first tier can be configured for long-distance item delivery and UAVs of the second tier can be configured for short-distance item delivery. In some instances, additional weight of the larger batteries in UAVs of the first tier can be balanced by having a smaller maximum load weight than UAVs of the second tier. As such, in some examples, UAVs of the first tier can deliver items up to a threshold maximum weight, and UAVs of the second tier can deliver items that have a weight greater than or equal to the maximum weight of the first tier, but less than a threshold maximum weight of the second tier. Additionally, UAVs of the second tier can have a threshold maximum range, and UAVs of the first tier can have a threshold maximum range that is greater than the maximum range of the UAVs of the second tier. Accordingly, in such examples, UAVs of the first tier can be configured for long-distance item delivery of light-weight items, and UAVs of the second tier can be configured for short-distance delivery of heavy-weight items.

VII. ASSIGNING TEMPERATURE-SENSITIVE TASKS

As explained above, the ATSP can receive a request to fulfill a task that involves delivering a temperature-sensitive item. Such a task that involves delivering a temperature-sensitive item is also referred to herein as a temperature-sensitive task. In response to receiving the request, the ATSP can select an available UAV from the ATSP's fleet of UAVs to perform the task. As explained above, the UAV fleet can include a plurality of UAVs that have different specifications, perhaps different battery capacities. Additionally, different UAVs can be located at different locations and/or can have different battery energy levels when the ATSP is selecting a UAV to perform the task. To account for the variance in battery specifications, current UAV locations, and current UAV battery energy levels when selecting a UAV to perform the transport task, a method of selecting the UAV is desired.

Figure 5:
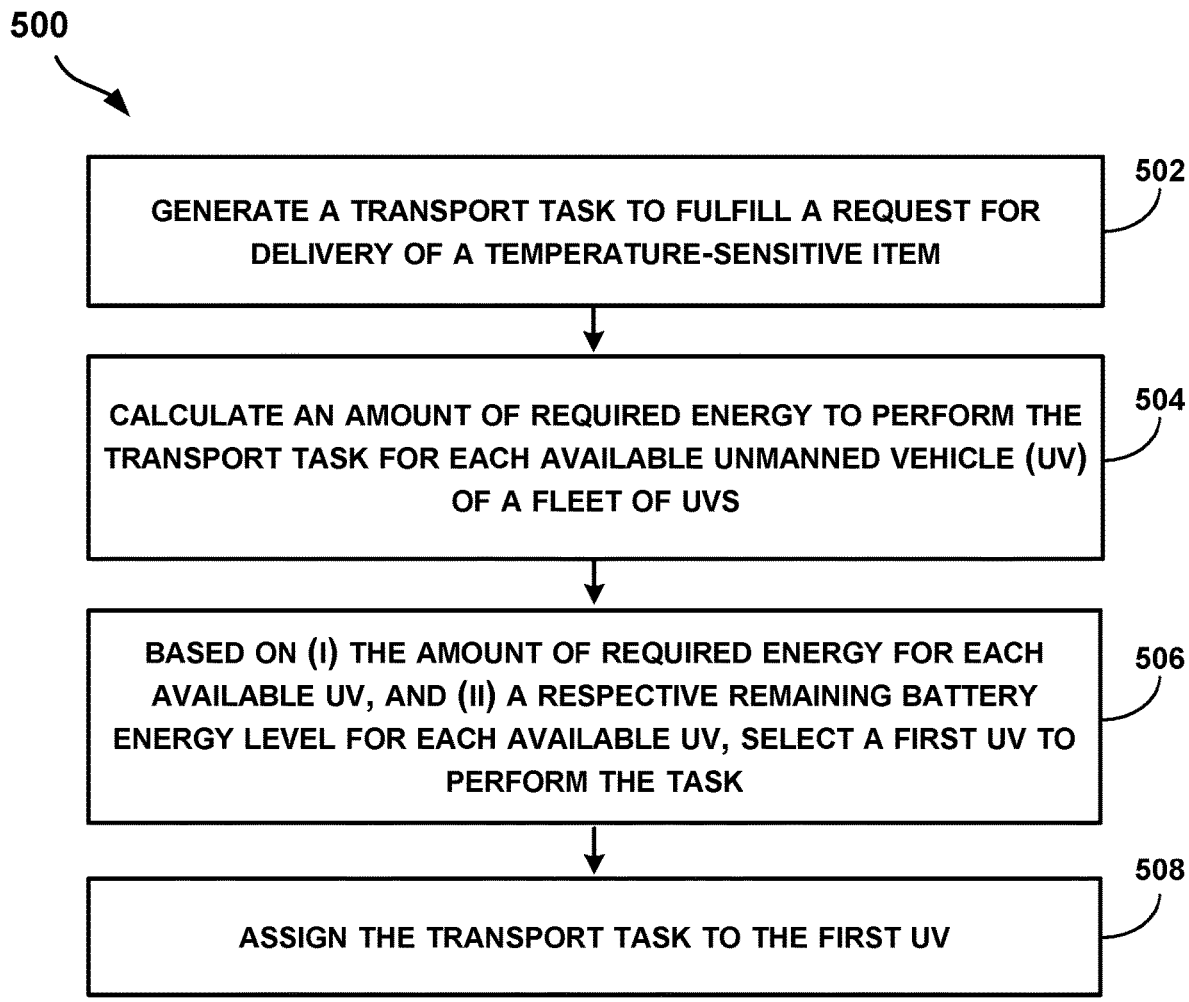
FIG. 5 is a flow chart illustrating a method, according to example embodiments.

FIG. 5 is a flow chart illustrating a method 500 for assigning a temperature-sensitive task to a UAV that can successfully perform the task, according to exemplary embodiments. Method 500 can be implemented by an ATSP in order to select a UAV from a fleet of UAVs to successfully perform a temperature-sensitive task without experiencing a failure event (e.g., the UAV battery depleting before the item is delivered). Method 500 is described by way of example as being implemented by an ATSP's computing system. However, it should be understood that method 500 could be implemented by other entities, other types of computing systems, or combinations of multiple computing systems, without departing from the scope of the invention. Furthermore, although the method is described below in the context of an unmanned aerial vehicle, the method can also be applicable to other types of unmanned vehicles.

As shown by block 502, the method 500 can involve an ATSP computing system generating a transport task to fulfill a request for delivery of a temperature-sensitive item. In some examples, a transport task can include maintaining a temperature of the temperature-sensitive item within a preferred temperature range during delivery. In an example, the ATSP can receive the request from a third-party entity, perhaps an item provider that provides the item. The request can include a pick-up location, a delivery location, a delivery timeframe, or more or less information, which the ATSP computing system can use to generate the temperature-sensitive transport task. In some examples, the request can include an indication that the item is temperature-sensitive. Also, in some examples, the request can include a preferred temperature range for the item. The preferred temperature range is a temperature range at which the item is preferably maintained during delivery of the item. And the preferred temperature range can be specified by the item provider or can be specified by a manufacturer or producer of the item.

In examples where the request does not include the preferred temperature range, the ATSP computing system can determine a preferred temperature range for the item in response to determining that the item identified in the request is temperature-sensitive. In one example, the ATSP computing system can determine that the item is temperature-sensitive based on a determination that a type of the item is temperature-sensitive. For instance, if the item is a pharmaceutical drug, the ATSP computing system can determine that the item is temperature-sensitive based on, for example, publicly available information, a proprietary database, or other source of preferred temperature ranges for delivery items. Once the ATSP computing system determines that the item is temperature-sensitive, the ATSP computing system can determine a preferred temperature range for the item, perhaps by looking up the preferred temperature range in a database (either remote or local) that lists preferred temperature ranges based on item type.

In another example, the ATSP computing device can determine that the item is temperature-sensitive by determining that the request is sent by a third-party entity that is designated as one that provides temperature-sensitive items. For instance, restaurants could be designated as item-providers that provide temperature-sensitive items. When the ATSP computing system receives a request from an entity that is designated as one that provides temperature-sensitive items, the ATSP computing system can determine that the item to be delivered is temperature-sensitive. Once the ATSP computing system determines that the item is temperature-sensitive, the ATSP computing system can determine a preferred temperature range for the item, perhaps by searching a database (either local or remote) that arranges temperature ranges based on the type of entity that is providing the item and/or based on the type of the item.

Once the ATSP computing system has determined a pick-up location, a delivery location, a delivery timeframe, and a preferred temperature range for the item, the ATSP computing system can use the determined information to generate a transport task to fulfill the request. The temperature-sensitive transport task can include instructions to deliver the item to the delivery location within the delivery timeframe while maintaining a temperature of the item at a temperature within the preferred temperature range.

As shown by block 504, once the ATSP computing system has generated the transport task, the ATSP computing system can calculate an amount of required energy (e.g., electrical energy) to perform the transport task for each available unmanned vehicle (UV) of a fleet of UVs. An available UAV is a UAV that is not currently performing a task or is not scheduled to perform a task for a threshold period of time. For each available UAV, the ATSP computing system can calculate an amount of required energy that the UAV would consume to pick-up and deliver the item while maintaining a temperature of the item within the preferred temperature range for the item.

In an embodiment, the ATSP computing system can use a distance that the UAV would travel to deliver the item in order to calculate the respective amount of energy that a UAV would consume to perform the transport task. This distance, also called the travel distance, can include the distance from a current location of the UAV to a pick-up location of the item (e.g., a warehouse), the distance from the pick-up location to the delivery location, and/or the distance from the delivery location to a nearby UAV base location (e.g., a UAV nest). In particular, the ATSP computing system can calculate an estimated amount of energy that the UAV would consume to travel the travel distance.

In an embodiment, the amount of energy that the UAV would consume when traveling the travel distance could also depend on a total weight of the UAV. Accordingly, the ATSP computing system can account for the weight of the UAV when calculating the amount of energy that the UAV would consume when traveling the travel distance. However, the total weight of the UAV can change depending on whether the UAV is carrying the item or not.

Specifically, once the UAV picks up the item, the total weight of the UAV is a sum of a weight of the UAV and a weight of the item. Thus, the ATSP computing system can use the weight of the UAV to calculate the amount of energy that the UAV would consume when traveling from the UAV's current location and from the delivery location to a nearby UAV nest. And the ATSP computing system can use the total weight of the UAV and the item to calculate the amount of energy that the UAV would consume when traveling from the pick-up location to the delivery location.

The total amount of energy that the UAV would consume while traveling the travel distance is a sum of the energy that would be consumed during each leg of the journey.

Additionally, the ATSP computing system can calculate the amount of energy that the UAV would consume to operate a temperature control unit at a temperature within the preferred temperature range during the delivery. For the purposes of the calculation, the ATSP computing system can select the temperature based on one or more factors, such as the external temperature during the delivery, a desired temperature to maintain during delivery, which may be based on a median temperature of the preferred temperature range or a higher or lower temperature within the preferred temperature range. Additionally and/or alternatively, the ATSP computing system can select different temperatures at which to operate the temperature control unit at different stages of the flight. For instance, the UAV can operate the temperature control unit at a first temperature during a first portion of the flight (e.g., from the UAV's starting location to a pick-up location), and can operate the temperature control unit at a second temperature during a second portion of the flight (e.g., from the pick-up location to the delivery location).

Once the ATSP computing system has selected the temperature(s) for the calculation, the ATSP can calculate an estimated amount of energy that the UAV would consume to operate the temperature control unit at the selected temperature(s) during delivery. In an example, to perform the calculation, the ATSP computing system can determine an estimated length of time that the temperature control unit needs to be operated during the delivery. Then, the ATSP computing system can determine the amount of energy that would be needed to operate the temperature-controlled payload at the selected temperature for the estimated length of time.

Accordingly, the amount of required energy that the UAV would consume to perform the task can be the sum of: (i) the amount of energy that the UAV would consume to travel along the travel distance, and (ii) the amount of electrical energy that the UAV would consume to operate a temperature control unit. Within examples, when selecting a UAV to perform the transport task, the ATSP computing system can perform this calculation for each available UAV in the fleet of UAVs.

As shown by block 506, based on (i) the amount of required energy for each available UAV, and (ii) a respective remaining battery energy level for each available UAV, the ATSP computing system can select a first UAV to perform the task.

In embodiment, the ATSP computing system can communicate with each available UAV to determine a respective remaining battery energy level of each UAV. Additionally and/or alternatively, the ATSP computing system can keep a dynamic record of the battery energy levels of the fleet of UAVs. The ATSP computing system can continuously or periodically update the dynamic record. Then, based on the respective remaining battery energy level, the ATSP computing system can determine the respective remaining amount of energy in the battery of each UAV. To do so, the ATSP can determine the specifications of each UAV's battery, perhaps by determining a battery tier in which each UAV is included.

In an embodiment, the ATSP computing system can select the first UAV by calculating, for each UAV, a difference between the amount of required energy to perform the transport task and the respective remaining amount of energy in the battery of the UAV. Based on the differences calculated for the UAVs, the ATSP computing system can determine a subset of UAVs that are capable of delivering the item. In an example, the subset of UAVs can include UAVs for which the difference between the (i) the amount of required energy, and (ii) the respective remaining battery energy is greater than zero. As such, the subset of UAVs includes UAVs of the fleet that have the required battery energy to perform the transport task.

In an embodiment, the ATSP computing system can use one or more factors to select the first UAV from the subset of UAVs. In one example, the ATSP computing system can use an estimated delivery time to select the first UAV. In particular, the ATSP computing system can determine a respective estimated delivery time for each UAV in the subset. Then, the ATSP computing system, can select the UAV with the shortest delivery time (i.e., fastest delivery), which, in this example, is the first UAV. In another example, the ATSP computing system can use an estimated delivery efficiency to select the first UAV. In particular, the ATSP computing system can calculate an estimated delivery efficiency for each of the UAVs in the subset. For example, the delivery efficiency may be calculated based on the percentage of the UAV's resources (e.g., battery energy, time) that are used during the delivery. Then, the ATSP computing system can select a UAV with the greatest efficiency, which, in this example, is the first UAV. Other example factors are also possible.

As shown by block 508, once the ATSP computing system has selected the first UAV to perform the transport task, the ATSP computing system can assign the task to the first UAV. Once the first UAV receives the transport task, the first UAV can perform the transport task.

Note that the ATSP computing system can also use the method 500 or a similar method to select a UAV to deliver more than one temperature-sensitive item. In an example, the third-party entity could request delivery of more than one item from the same pick-up location. The items could have the same or different delivery locations. In another example, the third-party entity could request that the more than one item is picked up from different pick-up locations, and deliver the items to the same or different delivery locations.

In still other examples, a fleet may include one UV, and this method may be used to determine whether the one UV is capable of performing the transport task.

As explained above, in some instances, the UAVs of the ATSP can be categorized into tiers. In some examples, it may be more computationally efficient to first determine which tier of UAVs is better suited to perform the transport task. Then, the ATSP computing system can select an available UAV from the selected tier of UAVs.

Figure 6:
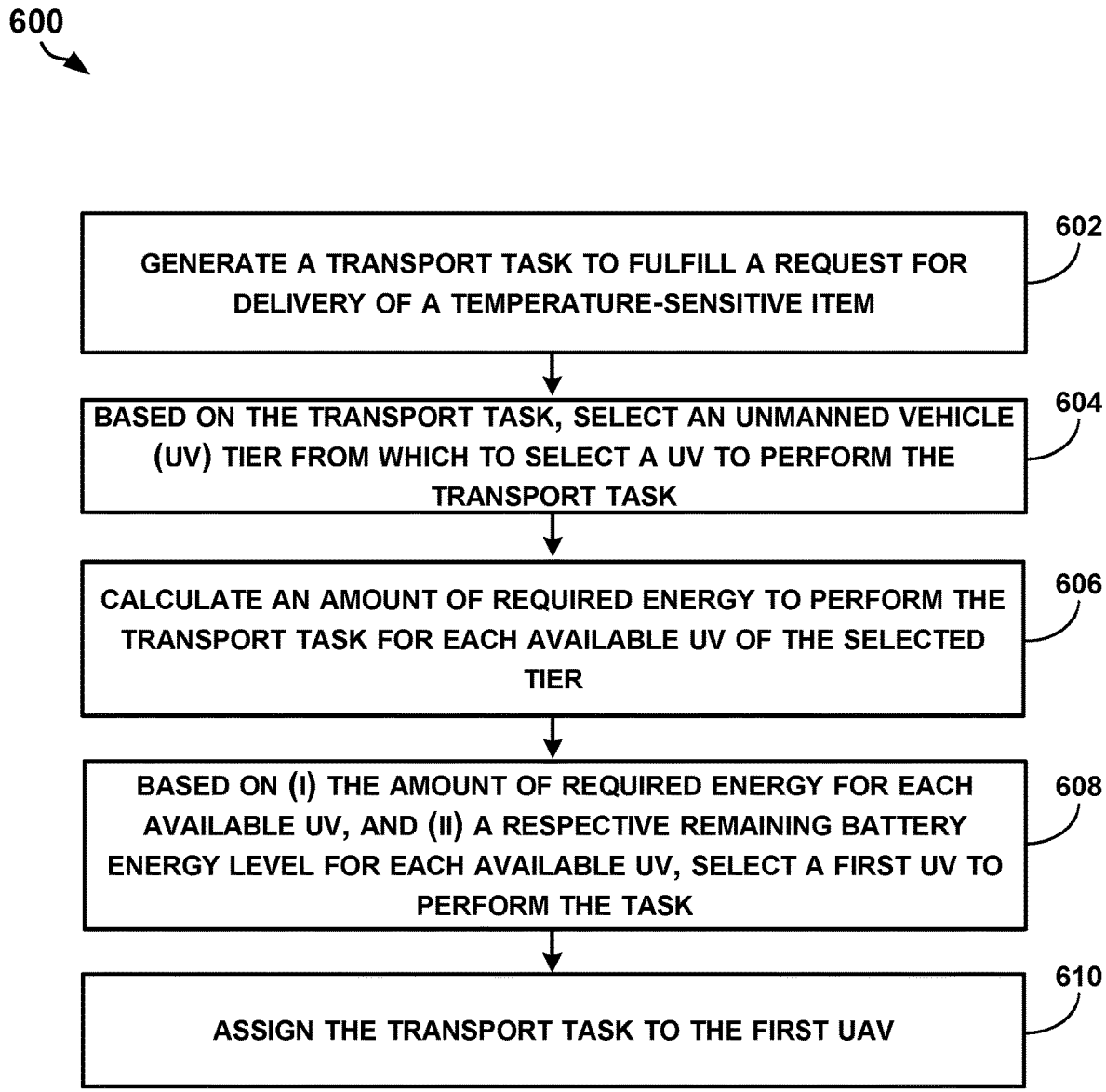
FIG. 6 is a flow chart illustrating a method, according to example embodiments.

FIG. 6 is a flow chart illustrating a method 600 for assigning a temperature-sensitive task to a UAV that can successfully perform the task, according to exemplary embodiments. Method 600 can be implemented by an ATSP in order to select a UAV from a fleet of UAVs to successfully perform a temperature-sensitive task without experiencing a failure event (e.g., the UAV battery depleting before the item is delivered). Method 600 is described by way of example as being implemented by an ATSP's computing system. However, it should be understood that method 600 could be implemented by other entities, other types of computing systems, or combinations of multiple computing systems, without departing from the scope of the invention.

As shown by block 602, the method 600 can involve an ATSP computing system generating a transport task to fulfill a request for delivery of a temperature-sensitive item. In some examples, the transport task can include maintaining a temperature of the temperature-sensitive item within a preferred temperature range during delivery. As shown by block 604, the method 600 can involve the ATSP computing system, based on the transport task, selecting a UAV tier from which to select a UAV to perform the transport task. As explained above, in an example, the ATSP can include two tiers of UAVs that are based on UAV battery capacity. The first tier could include UAVs with large batteries, and thus, the UAVs can be configured for long distance deliveries. In some examples, UAVs in the first tier could be limited to transporting items that do not exceed a maximum weight. The second tier could include UAVs with small batteries, and thus, the UAVs could be configured for short distance deliveries. Additionally, the UAVs in the second tier could transport heavier items than UAVs in the first tier.

In an embodiment, selecting a UAV tier from which to select a UAV to perform the transport task can involve the ATSP computing system determining at least one of a weight item and a delivery location of the item. Based on the weight and/or delivery location of the item, the ATSP computing system can select either the first tier or the second tier as one that would be more suitable for delivering the item. In an example, if the item weighs less than a threshold weight for the second tier and/or is within range of the UAVs in the second tier, the ATSP computing system can select the second tier. In another example, if the item's weight exceeds the threshold weight for the second tier, but is less than the maximum weight for the first tier, the ATSP computing system can then determine if the delivery location is within range of UAVs of the first tier. If the delivery location is within range, the ATSP can select the first tier. In yet another example, the weight of the item could be less than the threshold maximum weight for both the first tier and the second tier. In this example, the ATSP can determine a delivery location of the item. If the delivery location is within a range of the UAVs of the first tier, the ATSP computing system can select the first tier. Otherwise, the ATSP computing system can select the second tier. Other examples are also possible.

As shown by block 606, the method involves the ATSP computing system calculating an amount of required energy to perform the transport task for each available UV of the selected tier. As shown by block 608, the method further involves based on (i) the amount of required energy for each available UAV, and (ii) a respective remaining battery energy level for each available UAV, selecting a first UAV to perform the task. And as shown by block 610, the method involves the ATSP computing system assigning the transport task to the first UAV.

As explained above, in some examples, a temperature control unit can take the form of packaging that includes a power system that can be used to power the temperature control unit. For instance, the power system can include a power source (e.g., an energy storage device) that can power the temperature-control components of the temperature control unit. In some examples, the self-powered packaging can be used to provide power to a UAV by either directly powering the UAV or by recharging a UAV battery. Such functionality allows the self-powered packaging to effectively operate as a backup power source for a UAV. The UAV can use the backup power source to extend a range of the UAV.

Within examples, the ATSP can include a plurality of self-powered packaging tiers based on energy storage capacity, where each tier includes packaging with a particular energy storage capacity or includes packaging with an energy storage capacity that falls within a particular range. Because the packagings of different tiers have different energy storage capacities, the packaging of the different tiers could also have different features, such as weight. Generally, the weight of an energy storage device is proportional to the capacity of the energy storage device. Thus, a packaging with a larger energy storage capacity is generally heavier than a packaging with a smaller energy storage capacity.

As a result of having different features, the packaging from different tiers can be configured for use in different types of tasks. For instance, a packaging with a large energy storage capacity can be used for long-distance item delivery since a UAV that is delivering the item can use the energy storage device to extend the UAV's range to reach a long-distance delivery location. However, because large energy storage devices come with the caveat of a heavy weight, a packaging with a larger energy storage capacity can have a smaller weight limit than a packaging with a smaller energy storage capacity. Note that referring to an energy storage device as having a "large" energy storage capacity can mean that the energy storage capacity is greater than or equal to a threshold capacity. Conversely, referring to an energy storage device as having a "small" energy storage capacity can mean that the energy storage capacity is smaller than a threshold capacity.

Because different packaging can be configured for different types of tasks, an ATSP computing system can select a particular packaging to be used in a particular transport task. However, in order to account for the difference in specifications between the different packaging, a method of selecting a packaging to be used in a transport task is desired.

Figure 7:
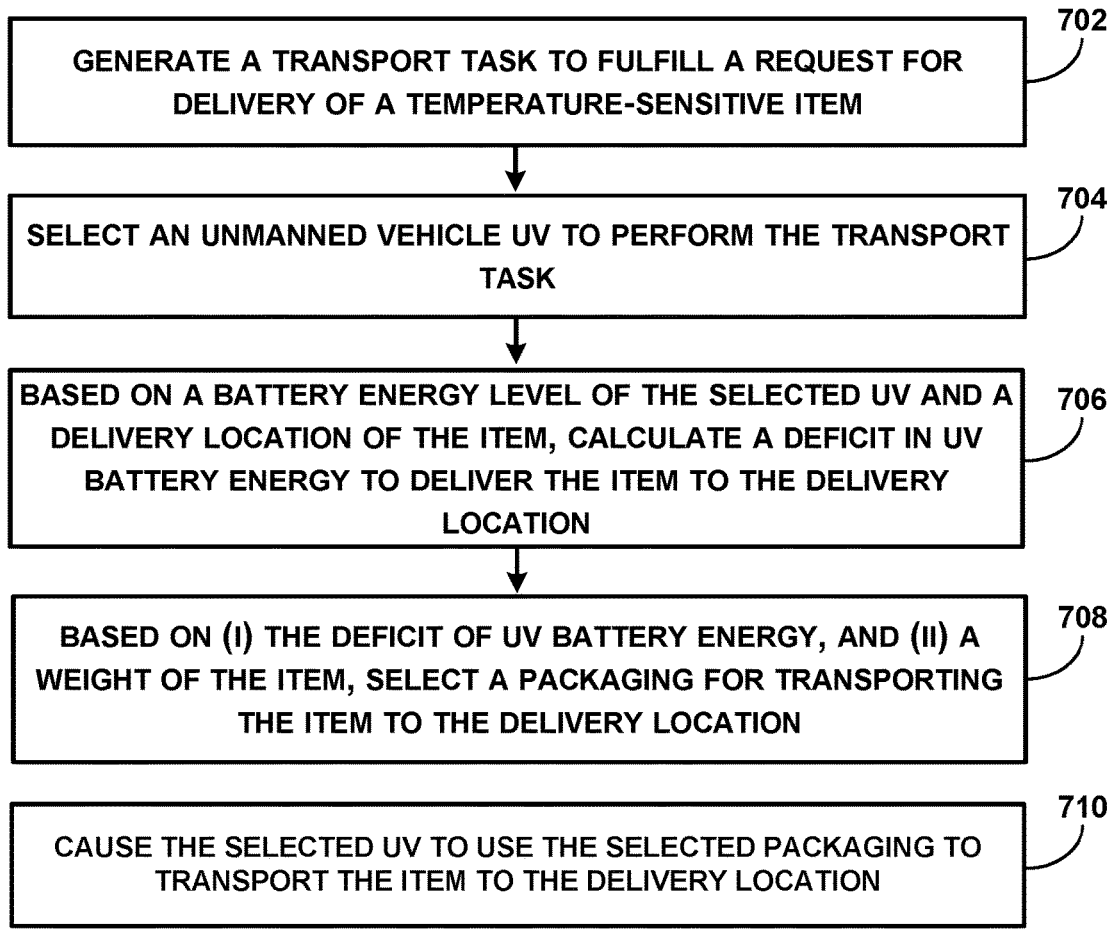
FIG. 7 is a flow chart illustrating a method, according to example embodiments.

FIG. 7 is a flow chart illustrating a method 700 for selecting a packaging to be used in a temperature-sensitive task, according to exemplary embodiments. Method 700 can be implemented by an ATSP in order to select, from a plurality of packaging, a packaging that can be used by a UAV to successfully perform a temperature-sensitive task without experiencing a failure event (e.g., the UAV battery depleting before the item is delivered). In particular, the method 700 can balance between a weight of a payload (i.e., the packaging and the item being transported) and a desired range that can be achieved by a UAV transporting the payload. The method 700 is described by way of example as being implemented by an ATSP's computing system. However, it should be understood that the method 700 could be implemented by other entities, other types of computing systems, or combinations of multiple computing systems, without departing from the scope of the invention.

As illustrated by block 702, the method 700 involves the ATSP computing system generating a transport task to fulfill a request for delivery of a temperature-sensitive item, where the transport task includes maintaining a temperature of the temperature-sensitive item within a preferred temperature range during delivery. Within examples, the request could be indicative of a pickup location of the item, a delivery location of the item, a delivery time-frame, a weight of the item, among other information that could be useful for delivery of the item (e.g., the preferred temperature range of the item).

As shown by block 704, the method 700 also involves the ATSP computing system selecting a UAV to perform the transport task. In one example, the ATSP computing system can select any of the available UAVs of the ATSP's fleet of UAVs. In another example, the ATSP computing system can select one of the available UAVs based on one or more factors, such as a current UAV battery energy level, a location of the UAV, a schedule of the UAV, among other factors.

As shown by block 706, the ASTP computing system can then, based on a battery energy level of the selected UAV and a delivery location of the item, calculate a deficit in the UAV battery energy needed to deliver the item. For instance, the amount of energy needed to deliver the item can be estimated based on a total travel distance, the preferred temperature range, and/or a weight of the item. Then the deficit in the UAV battery energy can be calculated by subtracting the amount of energy needed to deliver the item from an amount of energy stored in a battery of the selected UAV. By calculating the deficit in battery energy, the ATSP computing system can determine an amount of energy that would be needed in order for the UAV to have enough energy to deliver the item while maintaining a temperature of the item at a temperature within the preferred temperature range.

As shown by block 708, once the ATSP computing system has calculated the deficit in UAV battery energy, the ATSP computing system can then, based on (i) the deficit of UAV battery energy, and (ii) a weight of the item, select a packaging for the transporting the item to the delivery location. In an example, the ATSP computing system can determine packaging that has an energy storage capacity greater than the energy deficit of the UAV battery. For instance, the ATSP computing system can determine which packaging tiers have an energy storage capacity greater than the energy deficit. Then, the ATSP computing system can determine which of the packaging tiers can carry the item without exceeding a weight limit of the UAV. If more than one packaging tier can carry the item without exceeding the weight limit of the selected UAV, then the UAV can select from the more than one packaging tiers based on one or more factors. For instance, the ATSP computing system can select the packaging tier with the lightest weight. Other factors are also possible.

Once the ATSP has selected the packaging, the ATSP computing system can cause the selected UAV to pick up the item with the selected packaging. In an example, the packaging can be supplied to item providers, and thus can be available at the pick-up location. In another example, the selected UAV can pick up the packaging from a nest or other location before picking up the item from the pickup location.

VIII. ADDITIONAL EMBODIMENTS

As explained above, a self-powered packaging can include a rechargeable energy storage device. This feature, amongst other features, allows the packaging to be reusable for transport tasks, such as temperature sensitive tasks. Such a feature can be useful in certain cases where a UAV delivery task could involve both transporting an item or items to a recipient at a designated delivery location, and also transporting an item or items back from the delivery location. For instance, when food is delivered by a UAV, the recipient may eat their food, and then place reusable or recyclable utensils, tableware, dishware, or food packaging back in the UAV, so that the UAV can carry it back to be re-used for subsequent deliveries and/or recycled.

As another example, a UAV could provide for a product exchange, where a UAV transports a new product to a delivery location specified by a recipient (e.g., the recipient's home or work address). After delivering the new product, the UAV may allow the recipient a certain period of time to place a previously ordered product (of the same or different type) in a bay in the UAV, or to otherwise secure the previously ordered product in the packaging, in order to return the previously ordered product to a seller.

In the above and other scenarios, rather than sending another UAV with another packaging in order to retrieve the items from the delivery location, it can be more efficient to utilize the already used packaging in item return scenarios. More specifically, a UAV may initiate or request initiation of a recipient-assisted recharging process at the delivery location, such that the packaging can recharge its battery or batteries to allow for return of items such as temperature-sensitive items.

In a further aspect, when a group of battery-powered unmanned aerial vehicles (UAVs) is utilized for item transport service (e.g., delivery of goods), the amount of transport flights that can be completed over a period of time varies according to the amount of time and frequency with which UAVs need to recharge their batteries. Furthermore, the range or coverage will vary according to battery life, which in large part dictates how far a UAV can fly to deliver an item. Accordingly, methods and systems that improve battery capacity, reduce battery weight, more efficiently use battery power, and recharge batteries more quickly and efficiently, are beneficial.

In a typical delivery scenario using an electric vehicle without recipient-assisted recharging, the delivery range is limited to half the distance the vehicle can travel on a charge of the UAV and the packaging (to allow for travel to and from the delivery location). By utilizing such a recipient-assisted recharging process at delivery locations, example methods can help to extend the delivery range for UAV transport tasks to more than half the distance a UAV can otherwise travel. In particular, by utilizing a recipient-assisted recharging process that allows a packaging to be recharged (partially or wholly) at the delivery location, a UAV does not need to save as much (or possibly any) battery power for a return flight.

IX. CONCLUSION

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims

What is claimed is:

1. A computer-implemented method comprising:
   generating a transport task to fulfill a request for delivery of a temperature-sensitive item, wherein the transport task includes maintaining a temperature of the temperature-sensitive item within a preferred temperature range during a delivery of the temperature-sensitive item;
   based on the transport task, selecting an available unmanned vehicle (UV) from a fleet of UVs to travel a total travel distance to complete the transport task;
   determining, based on a battery energy level of the selected available UV, an energy deficit in the battery energy level of the selected available UV needed to account for an estimated sum of energy to be consumed during the transport task, wherein the estimated sum of energy to be consumed includes an amount of energy expected to be consumed in maintaining the preferred temperature range during the delivery and an amount of energy estimated to be consumed in traveling the total travel distance of the transport task;

selecting a self-powered packaging unit from a plurality of self-powered packaging units to hold the temperature-sensitive item and to electrically couple to the UV based on the selected self-powered packaging unit having an energy capacity greater than the energy deficit in the battery energy level of the selected available UV;
and
controlling the selected available UV to use the selected self-powered packaging unit to perform the transport task.

2. The computer-implemented method of claim 1, wherein generating a transport task to fulfill a request for delivery of a temperature-sensitive item comprises:
determining the preferred temperature range for the temperature-sensitive item.

3. The computer-implemented method of claim 2, wherein the preferred temperature range is based on a type of the temperature-sensitive item.

4. The computer-implemented method of claim 1, wherein selecting the available UV from the fleet of UVs to travel the total travel distance to complete the transport task comprises:
calculating a respective delivery efficiency for each UV; and
based on the respective delivery efficiencies of the UVs, selecting the available UV, wherein the available UV has a greatest respective delivery efficiency amongst the respective delivery efficiencies of the UVs.

5. The computer-implemented method of claim 1, wherein selecting the available UV from the fleet of UVs to travel the total travel distance to complete the transport task comprises:
calculating a respective delivery time for each UV; and
based on the respective delivery times of the UVs, selecting the available UV, wherein the available UV has a fastest respective delivery time amongst the respective delivery times of the UVs.

6. The computer-implemented method of claim 1, wherein calculating the estimated sum of energy to be consumed during the transport task is further based on at least one of: (i) a respective estimated travel distance for the UV to perform the transport task, or (ii) a respective weight of the UV.

7. The computer-implemented method of claim 6, wherein the respective estimated travel distance comprises: (i) a first distance from a respective current location of the UV to a pick-up location of the temperature-sensitive item, (ii) a second distance from the pick-up location to a delivery location of the temperature-sensitive item, and (iii) a third distance from the delivery location to a UV charging station near to the delivery location.

8. The computer implemented method of claim 1 wherein the self-powered packaging unit includes a power system comprising at least one power source configured to power the self-powered packaging unit.

9. A system comprising:
a fleet of unmanned vehicles (UVs) that are configured to transport temperature-sensitive items;
at least one communication interface operable to communicate with item-provider computing devices;
at least one processor; and
program instructions stored on a non-transitory computer readable medium and executable by the at least one processor to perform functions including:
generating a transport task in response to receiving from an item-provider computing device a request for delivery of a temperature-sensitive item, wherein the transport task involves delivering the temperature-sensitive item while maintaining a temperature of the temperature-sensitive item within a preferred temperature range;
based on the transport task, selecting an available unmanned vehicle (UV) from ea fleet of UVs to travel a total travel distance to complete the transport task;
determining, based on a battery energy level of the selected available UV, an energy deficit in the battery energy level of the selected available UV needed to account for an estimated sum of energy to be consumed during the transport task, wherein the estimated sum of energy to be consumed includes an amount of energy expected to be consumed in maintaining the preferred temperature range during the delivery and an amount of energy estimated to be consumed in traveling the total travel distance of the transport task;
selecting a self-powered packaging unit from a plurality of self-powered packaging units to hold the temperature-sensitive item and to electrically couple to the UV based on the selected self-powered packaging unit having an energy capacity greater than the energy deficit in the battery energy level of the selected available UV;
and
controlling the selected available UV to use the selected self-powered packaging unit to perform the transport task.

10. The system of claim 9, wherein the self-powered packaging unit comprises one of: a heating element or a cooling element.

11. The system of claim 9, wherein the self-powered packaging unit comprises one or more temperature sensors that are configured to monitor at least a temperature of a compartment of the self-powered packaging unit.

12. The system of claim 9, wherein the self-powered packaging unit includes a rechargeable energy storage device, wherein the rechargeable energy storage device is configured to provide power to the self-powered packaging unit and the UV, wherein power is provided to the UV by at least one of: (i) directly providing power to the UV, or (ii) recharging at least one battery of the UV.

13. The system of claim 9, wherein the self-powered packaging unit comprises a communication system configured to establish a communication link between the self-powered packaging unit and the available UV.

14. The system of claim 9, wherein generating a transport task to fulfill a request for delivery of a temperature-sensitive item comprises:
determining a preferred temperature range for the temperature-sensitive item.

15. The system of claim 9, wherein selecting the available UV from the fleet of UVs to travel the total travel distance to complete the transport task comprises:
calculating a respective delivery efficiency for each UV; and
based on the respective delivery efficiencies of the UVs, selecting the available UV, wherein the available UV has a greatest respective delivery efficiency amongst the respective delivery efficiencies of the UVs.

16. The system of claim 9, wherein selecting the available UV from the fleet of UVs to travel the total travel distance to complete the transport task comprises:
calculating a respective delivery time for each UV; and based on the respective delivery times of the UVs, selecting the available UV, wherein the available UV has a fastest respective delivery time amongst the respective delivery times of the UVs.

17. A computer-implemented method comprising:

generating a transport task to fulfill a request for delivery of a temperature-sensitive item, wherein the transport task involves delivering the temperature-sensitive item while maintaining a temperature of the temperature-sensitive item within a preferred temperature range;

based on the transport task, selecting an available unmanned vehicle (UV) from a fleet of UVs to travel a total travel distance to complete the transport task;

determining, based on a battery energy level of the selected available UV, an energy deficit in the battery energy level of the selected available UV needed to account for an estimated sum of energy to be consumed during the transport task, wherein the estimated sum of energy to be consumed includes an amount of energy expected to be consumed in maintaining the preferred temperature range during the delivery and an amount of energy estimated to be consumed in traveling the total travel distance of the transport task;

selecting a self-powered packaging unit from a plurality of self-powered packaging units to hold the temperature-sensitive item and to electrically couple to the UV based on the selected self-powered packaging unit having an energy capacity greater than the energy deficit in the battery energy level of the selected available UV;

and controlling the selected available UV to use the selected self-powered packaging unit to perform the transport task.

* * * * *